United States Patent
Liu et al.

(10) Patent No.: US 9,730,203 B2
(45) Date of Patent: Aug. 8, 2017

(54) METHOD FOR ASSIGNING NUMBER OF CONTROL CHANNEL CANDIDATES AND NUMBER OF BLIND DETECTION TIMES, BASE STATION, AND USER EQUIPMENT

(71) Applicant: Huawei Technologies Co., Ltd., Shenzhen (CN)

(72) Inventors: Jianqin Liu, Beijing (CN); Kunpeng Liu, Beijing (CN); Qiang Wu, Beijing (CN); Yongxing Zhou, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 14/599,841

(22) Filed: Jan. 19, 2015

(65) Prior Publication Data

US 2015/0131591 A1    May 14, 2015

Related U.S. Application Data

(63) Continuation of application No. PCT/CN2012/084025, filed on Nov. 2, 2012.

(51) Int. Cl.
*H04W 72/04* (2009.01)
*H04L 5/00* (2006.01)

(52) U.S. Cl.
CPC .......... *H04W 72/042* (2013.01); *H04L 5/00* (2013.01); *H04W 72/04* (2013.01); *H04L 5/0053* (2013.01)

(58) Field of Classification Search
CPC ...... H04W 72/04; H04W 88/08; H04W 76/00
See application file for complete search history.

(56) References Cited

U.S. PATENT DOCUMENTS

2009/0088148 A1 * 4/2009 Chung .................. H04L 5/0007
455/423
2009/0103562 A1 * 4/2009 Frederiksen .......... H04W 28/18
370/468

(Continued)

FOREIGN PATENT DOCUMENTS

CN       102255688 A    1/2011
CN       102035772 A    4/2011

(Continued)

OTHER PUBLICATIONS

Notice of Allowance issued on Dec. 9, 2016 in the corresponding Korean application.

(Continued)

*Primary Examiner* — Hassan Phillips
*Assistant Examiner* — Prenell Jones
(74) *Attorney, Agent, or Firm* — Kilpatrick Townsend & Stockton LLP

(57) ABSTRACT

The present invention provides a method for assigning the number of control channel candidates and the number of blind detection times, a base station, and a user equipment. The method includes determining a first aggregation level set $\{L_{1i}\}$ and determining the number of EPDCCH candidates corresponding to each aggregation level in the $\{L_{1i}\}$. $\{L_{1i}\}$ is formed by N aggregation levels supported by an EPDCCH. A second aggregation level set $\{L_{2j}\}$ is determined along with the number of EPDCCH candidates corresponding to each aggregation level in the $\{L_{2j}\}$. $\{L_{2j}\}$ is formed by M aggregation levels supported by an EPDCCH to be detected, $\{L_{2j}\}$ is a subset of $\{L_{1i}\}$, and the number of EPDCCH candidates corresponding to $L_{2j}$ in $\{L_{2j}\}$ is greater than or equal to the number of EPDCCH candidates corresponding to $L_{2j}$ in $\{L_{1i}\}$.

14 Claims, 14 Drawing Sheets

(56) References Cited

U.S. PATENT DOCUMENTS

| | | | |
|---|---|---|---|
| 2010/0135237 A1* | 6/2010 | Papasakellariou | H04L 5/0007 370/329 |
| 2010/0304689 A1 | 12/2010 | McBeath et al. | |
| 2011/0103509 A1* | 5/2011 | Chen | H04L 5/0007 375/295 |
| 2011/0105162 A1* | 5/2011 | Kim | H04L 1/001 455/500 |
| 2011/0292891 A1 | 12/2011 | Hsieh et al. | |
| 2011/0310817 A1* | 12/2011 | Okubo | H04L 5/0003 370/329 |
| 2012/0051270 A1 | 3/2012 | Chen et al. | |
| 2012/0054258 A1* | 3/2012 | Li | H04W 72/0406 709/201 |
| 2012/0082130 A1* | 4/2012 | Xue | H04L 5/001 370/330 |
| 2012/0190377 A1* | 7/2012 | Li | H04L 1/0061 455/452.1 |
| 2012/0190395 A1* | 7/2012 | Pan | H04L 5/001 455/509 |
| 2012/0201230 A1* | 8/2012 | Wang | H04L 5/0007 370/336 |
| 2013/0003692 A1 | 1/2013 | Nishio et al. | |
| 2013/0064215 A1* | 3/2013 | Gao | H04L 5/0016 370/330 |
| 2013/0194931 A1* | 8/2013 | Lee | H04L 5/0053 370/241 |
| 2014/0050159 A1* | 2/2014 | Frenne | H04W 72/042 370/329 |
| 2014/0192770 A1* | 7/2014 | Soldati | H04L 5/0048 370/330 |
| 2014/0301341 A1 | 10/2014 | Pan | |
| 2015/0003401 A1* | 1/2015 | Wu | H04W 72/0406 370/329 |
| 2015/0215920 A1 | 7/2015 | Mochizuki et al. | |
| 2016/0191226 A1* | 6/2016 | Seo | H04L 5/001 370/241 |

FOREIGN PATENT DOCUMENTS

| | | |
|---|---|---|
| CN | 102368871 A | 3/2012 |
| CN | 102404076 A | 4/2012 |
| RU | 2009147463 A | 6/2011 |
| WO | 2011114743 A1 | 9/2011 |

OTHER PUBLICATIONS

Hua Wei, Hisilicon, "Search space design for EPDCCH," 3GPP TSG RAN WG1 Meeting #70bis, R1-124078, Oct. 8-12, 2012, 8 pages.

Panasonic, "EPDCCH search space and aggregation levels," 3GPP TSG RAN WG1 Metting #70bis, R1-124555, Oct. 8-12, 2012, 6 pages.

"3rd Generation Partnership Project; Technical Specification Group Radio Access Network; Evolved Universal Terrestrial Radio Access (E-UTRA); Physical Channels and Modulation (Release 11)," 3GPP TS 36.211, V11.0.0, Sep. 2012, 106 pages.

"3rd Generation Partnership Project; Technical Specification Group Radio Access Network; Evolved Universal Terrestrial Radio Access (E-UTRA); Physical Layer Procedures (Release 11)," 3GPP TS 36.213, V11.0.0, Sep. 2012, 143 pages.

LG Electronics: "Details of EPDCCH set configuration", 3GPP Draft; R1-124322, 3rd Generation Partnership Project (3GPP), vol. RAN WG1, No. San Diego, USA; Oct. 8-12, 2012 Sep. 29, 2012 (Sep. 29, 2012), XP050662220, Retrieved from the Internet: URL:http://www.3gpp.org/ftp/tsg_ranNVG1 RL1/TSGR1_70b/Docs/ [retrieved on Sep. 29, 2012].

* cited by examiner

METHOD FOR ASSIGNING NUMBER OF CONTROL CHANNEL CANDIDATES AND NUMBER OF BLIND DETECTION TIMES, BASE STATION, AND USER EQUIPMENT

This application is a continuation of International Application No. PCT/CN2012/084025, filed on Nov. 2, 2012, which is hereby incorporated by reference in its entirety.

TECHNICAL FIELD

Embodiments of the present invention relate to the field of wireless communications, and, in particular, to a method for assigning the number of control channel candidates and the number of blind detection times, a base station, and a user equipment.

BACKGROUND

A long term evolution (LTE) Rel-8/9/10 communications system employs a dynamic scheduling technology to improve system performance, that is, an evolved NodeB (eNB) schedules and allocates resources according to a channel state of each user equipment (UE), so that each scheduled user performs communication on an optimal channel of the user. In downlink transmission, the eNB sends a physical downlink shared channel (PDSCH) and a physical downlink control channel (PDCCH) corresponding to the PDSCH to each scheduled UE according to a result of the dynamic scheduling, where the PDSCH bears data that the eNB sends to the UE, and accordingly, the PDCCH is mainly used for indicating a transmission format or scheduling information of the PDSCH, for example, resource allocation, a transport block size, a modulation and coding scheme a transmission rank, precoding matrix information, and so on.

In one subframe, all PDCCHs used for uplink and downlink scheduling are multiplexed on N control channel elements (CCE) in a PDCCH region, where N is greater than 1, and the control channel elements are numbered from 0. Each PDCCH is an aggregation of L consecutive CCEs, where L is one of 1, 2, 4, or 8, that is, the PDCCH has four aggregation levels in total. The number of CCEs aggregated in each PDCCH is determined by the size of an information block size in the PDCCH and a channel state of a UE corresponding to the PDCCH. Before the PDCCH is sent, the N CCEs multiplexed in the PDCCH region are interleaved, and then the interleaved CCEs are mapped to a reserved RE in the PDCCH region in sequence and sent.

At a receiving end, the UE needs to perform blind detection on the N CCEs to obtain a PDCCH corresponding to the UE. At each CCE aggregation level, PDCCH candidates are limited. The less the candidate PDCCHs are, the less the number of blind detection times of the UE is. For example, in the prior art, when the CCE aggregation level L is equal to 8, the number of PDCCH candidates is 2, that is, only CCE 0 to CCE 7 and CCE 8 to CCE 15 need to be detected. Although such CCE assignment principle can reduce the number of blind detection times, the number of blind detection times corresponding to each aggregation level is still in positive correlation with the number N of CCEs in the PDCCH region, that is, the number of blind detection times increases as the N increases. To further reduce the complexity of blind detection, at each CCE aggregation level, the maximum number of times of blind detection that the UE needs to perform is defined, which is called a search space. Search spaces are classified into a common search space and a UE-specific search space, and the difference between the two lies in that a location of a start CCE in the common search space is fixed while a start CCE in the UE-specific search space is determined by an identifier of the UE and a subframe number of a subframe where the PDCCH is located. The common search space and the UE-specific search space may overlap each other.

An existing PDCCH is enhanced in LTE Rel-11, that is, a part of resources in a PDSCH region are divided to transmit an enhanced physical downlink control channel (EPDCCH), so that resources assigned to the control channel are more flexible, and are no longer limited by three orthogonal frequency division multiplexing (OFDM) symbols. The EPDCCH may use a transmission manner based on a demodulation reference signal (DMRS) to implement spatial reuse, so as to improve transmission efficiency of the control channel. For example, control channels of UEs serving different radio remote units (RRU) may occupy the same time frequency resource as long as being desirably isolated in space, and in this way, the capacity of the PDCCH or the number of UEs scheduled at the same time is improved.

Main conclusions passed on the $3^{rd}$ generation partnership (3GPP) radio access network (RAN) 170 bis standard conference are as follows. A UE performs blind detection in K EPDCCH sets, each EPDCCH set in the K EPDCCH sets is formed by M physical resource block pairs, and the value of M is 2, 4, or 8. In a case of a normal subframe (normal cyclic prefix) or special subframe (normal cyclic prefix) ratio 3, 4, or 8, when the number of valid resource units included in each physical resource block pair is less than a predetermined threshold, aggregation levels that can be supported by the EPDCCH are 2, 4, 8 or 16; and in other cases, aggregation levels that can be supported by the EPDCCH are 1, 2, 4, 8, or 16.

The total number of blind detection times of the UE is 32 (in a special case such as multiple-input multiple-output (MIMO), the total number of blind detection times of the UE is 48). First, the number of blind detection times is assigned to the aggregation levels that can be supported by the EPDCCH, and then is assigned among EPDCCH sets corresponding to each aggregation level.

Transmission formats that can be supported by the EPDCCH mainly include downlink control information (DCI) format series 1X, including 1, 1A, 1B, 1C, and the like; DCI format series 2X, including 2, 2A, 2B, 2C, and the like; and DCI formats 0, 4, and the like used for indicating a data transmission format of an uplink traffic channel. A payload of the DCI format series 2X is generally much greater than that of the DCI format series 1X.

In the current standard, aggregation levels that can be supported by an EPDCCH are determined by the comparison between the number of valid resource units included in each physical resource block pair in a search space where the EPDCCH is located and a predetermined threshold. When the number of valid resource units included in each physical resource block pair is greater than the predetermined threshold, a transmission code rate of the EPDCCH transmitted in the DCI format 1A is not greater than 0.8, but this conclusion is not applicable to an EPDCCH transmitted in the DCI format series 2X. For example, if it is determined according to the predetermined threshold that aggregation levels that can be supported by the EPDCCH are 1, 2, 4, 8, and 16, when the EPDCCH is transmitted in the DCI format 1A and at the lowest aggregation level 1, the transmission code rate of the EPDCCH is not greater than 0.8. However, when the EPDCCH is transmitted in the DCI format series 2X and at the lowest aggregation level 1, it cannot be ensured that the transmission code rate thereof is within a certain threshold, and the transmission code rate thereof is even possibly greater than 1.

In one subframe, when aggregation levels that can be supported by an EPDCCH is determined according to the foregoing predetermined threshold, the determined lowest aggregation level may not support data transmission in the DCI format series 2X. In this case, the UE skips blind detection for the DCI format series 2X at the lowest aggregation level, and only detects EPDCCH candidates transmitted in the DCI format series 2X at other aggregation levels. With further consideration, in some overhead combinations, sizes of the control channel elements are not balanced, and sizes of EPDCCH candidates corresponding to a certain aggregation level are not balanced either, which may lead to a phenomenon that at the same aggregation level, some EPDCCH candidates support transmission in the DCI format series 2X, while some EPDCCH candidates do not support transmission in the DCI format series 2X. In this case, in the prior art, the UE also skips the EPDCCH candidates that do not support the transmission in the DCI format series 2X, which decreases the utilization of the number of EPDCCH candidates and the number of blind detection times.

SUMMARY

Embodiments of the present invention provide a method for assigning the number of control channel candidates and the number of blind detection times, a base station, and a user equipment, which improve the utilization of EPDCCH candidates and the number of blind detection times.

According to a first aspect, a method for assigning the number of control channel candidates is provided, including determining a first aggregation level set $\{L_{1i}\}$, and determining the number of EPDCCH candidates corresponding to each aggregation level in the first aggregation level set $\{L_{1i}\}$, where $\{L_{1i}\}$ is formed by N aggregation levels supported by an EPDCCH, i is a positive integer, and a value of i ranges from 1 to N; and determining a second aggregation level set $\{L_{2j}\}$, and determining the number of EPDCCH candidates corresponding to each aggregation level in the second aggregation level set $\{L_{2j}\}$, where $\{L_{2j}\}$ is formed by M aggregation levels supported by an EPDCCH to be detected, j is a positive integer, a value of j ranges from 1 to M, $\{L_{2j}\}$ is a subset of $\{L_{1i}\}$, M≤N, and the number of EPDCCH candidates corresponding to $L_{2j}$ in $\{L_{2j}\}$ is greater than or equal to the number of EPDCCH candidates corresponding to $L_{2j}$ in $\{L_{1i}\}$.

With reference to the first aspect, in a first possible implementation manner, the determining the number of EPDCCH candidates corresponding to each aggregation level in the aggregation level $\{L_{1i}\}$ includes: determining (N−M) remaining aggregation level after the aggregation levels in $\{L_{2j}\}$ are removed from $\{L_{1i}\}$; determining the total number P of EPDCCH candidates corresponding to the (N−M) aggregation level in $\{L_{1i}\}$; and assigning P EPDCCH candidates to the aggregation levels in $\{L_{2j}\}$.

With reference to the first possible implementation manner of the first aspect, in a second possible implementation manner, the assigning P EPDCCH candidates to the aggregation levels in $\{L_{2j}\}$ includes: assigning P1 EPDCCH candidates to the aggregation levels in $\{L_{2j}\}$ in a first time; and assigning P2 EPDCCH candidates to the aggregation levels in $\{L_{2j}\}$ in a second time, where P1+P2≤P.

With reference to the second possible implementation manner of the first aspect, in a third possible implementation manner, the assigning P1 EPDCCH candidates to the aggregation levels in $\{L_{2j}\}$ in a first time includes: evenly assigning the P1 EPDCCH candidates to the aggregation levels in $\{L_{2j}\}$.

With reference to the second possible implementation manner of the first aspect, in a fourth possible implementation manner, the assigning P1 EPDCCH candidates to the aggregation levels in $\{L_{2j}\}$ in a first time includes: assigning the P1 EPDCCH candidates according to a ratio of the number of EPDCCH candidates corresponding to each aggregation level of $\{L_{2j}\}$ in $\{L_{1i}\}$ to the total number of EPDCCH candidates corresponding to all the aggregation levels of $\{L_{2j}\}$ in $\{L_{1i}\}$.

With reference to the second possible implementation manner of the first aspect, in a fifth possible implementation manner, the assigning P1 EPDCCH candidates to the aggregation levels in $\{L_{2j}\}$ in a first time includes: assigning the P1 EPDCCH candidates to the aggregation levels in $\{L_{2j}\}$ according to a proportional relationship between N and M.

With reference to the second possible implementation manner of the first aspect, in a sixth possible implementation manner, the assigning P2 EPDCCH candidates to the aggregation levels in $\{L_{2j}\}$ in a second time includes: cyclically assigning one EPDCCH candidate to each aggregation level in $\{L_{2j}\}$ in sequence according to an ascending order of the aggregation levels; or cyclically assigning one EPDCCH candidate to each aggregation level in $\{L_{2j}\}$ in sequence according to a descending order of the aggregation levels.

With reference to the second possible implementation manner of the first aspect, in a seventh possible implementation manner, the assigning P1 EPDCCH candidates to the aggregation levels in $\{L_{2j}\}$ in a first time includes: assigning the P1 EPDCCH candidates to one aggregation level in $\{L_{2j}\}$.

With reference to the first aspect and any one of the first to seventh possible implementation manners of the first aspect, in an eighth possible implementation manner, the determining a second aggregation level set $\{L_{2j}\}$ includes: determining $\{L_{2j}\}$ according to a DCI format of the EPDCCH to be detected and/or the number of available resource units of each physical resource block pair corresponding to the EPDCCH to be detected.

With reference to the eighth possible implementation manner of the first aspect, in a ninth possible implementation manner, the determining $\{L_{2j}\}$ according to a DCI format of the EPDCCH to be detected includes: determining at least one threshold according to the DCI format of the EPDCCH; and determining $\{L_{2j}\}$ according to the at least one threshold.

According to a second aspect, a method for assigning the number of blind detection times is provided, including: determining a first aggregation level set $\{L_{1i}\}$, and determining the number of blind detection times corresponding to each aggregation level in the first aggregation level set $\{L_{1i}\}$, where $\{L_{1i}\}$ is formed by N aggregation levels supported by an EPDCCH, i is a positive integer, and a value of i ranges from 1 to N; determining a second aggregation level set $\{L_{2j}\}$, and determining the number of blind detection times corresponding to each aggregation level in the second aggregation level set $\{L_{2j}\}$, where $\{L_{2j}\}$ is formed by M aggregation levels supported by an EPDCCH to be detected, j is a positive integer, a value of j ranges from 1 to M, $\{L_{2j}\}$ is a subset of $\{L_{1i}\}$, M≤N, and the number of blind detection times corresponding to $L_{2j}$ in $\{L_{2j}\}$ is greater than or equal to the number of blind detection times corresponding to $L_{2j}$ in $\{L_{1i}\}$.

With reference to the second aspect, in a first possible implementation manner, the determining the number of blind detection times corresponding to each aggregation level in the aggregation level $\{L_{2j}\}$ includes: determining (N−M) remaining aggregation level after the aggregation levels in $\{L_{2j}\}$ are removed from $\{L_{1i}\}$; determining the number P of blind detection times corresponding to the (N−M) aggregation level in $\{L_{1i}\}$; and assigning P times of blind detection to the aggregation levels in $\{L_{2j}\}$.

With reference to the first possible implementation manner of the second aspect, in a second possible implementation manner, the assigning P times of blind detection to the aggregation levels in $\{L_{2j}\}$ includes: assigning P1 times of blind detection to the aggregation levels in $\{L_{2j}\}$ in a first time; and assigning P2 times of blind detection to the aggregation levels in $\{L_{2j}\}$ in a second time, where P1+P2≤P.

With reference to the second possible implementation manner of the second aspect, in a third possible implementation manner, the assigning P1 times of blind detection to the aggregation levels in $\{L_{2j}\}$ in a first time includes: evenly assigning the P1 times of blind detection to the aggregation levels in $\{L_{2j}\}$.

With reference to the second possible implementation manner of the second aspect, in a fourth possible implementation manner, the assigning P1 times of blind detection to the aggregation levels in $\{L_{2j}\}$ in a first time includes: assigning the P1 times of blind detection according to a ratio of the number of blind detection times corresponding to each aggregation level of $\{L_{2j}\}$ in $\{L_{1i}\}$ to the total number of blind detection times corresponding to all the aggregation levels of $\{L_{2j}\}$ in $\{L_{1i}\}$.

With reference to the second possible implementation manner of the second aspect, in the fifth possible implementation manner, the assigning P1 times of blind detection to the aggregation levels in $\{L_{2j}\}$ in a first time includes: assigning the P1 times of blind detection to the aggregation levels in $\{L_{2j}\}$ according to a proportional relationship between N and M.

With reference to the second possible implementation manner of the second aspect, in a sixth possible implementation manner, the assigning P2 times of blind detection to the aggregation levels in $\{L_{2j}\}$ in a second time includes: cyclically assigning one time of blind detection to each aggregation level in $\{L_{2j}\}$ in sequence according to an ascending order of the aggregation levels; or cyclically assigning one time of blind detection to each aggregation level in $\{L_{2j}\}$ in sequence according to a descending order of the aggregation levels.

With reference to the second possible implementation manner of the second aspect, in a seventh possible implementation manner, the assigning P1 times of blind detection to the aggregation levels in $\{L_{2j}\}$ in a first time includes assigning the P1 times of blind detection to one aggregation level in $\{L_{2j}\}$.

With reference to the second aspect and any one of the first to seventh possible implementation manners of the second aspect, in an eighth possible implementation manner, the determining a second aggregation level set $\{L_{2j}\}$ includes determining $\{L_{2j}\}$ according to a DCI format of the EPDCCH to be detected and/or the number of available resource units of each physical resource block pair corresponding to the EPDCCH to be detected.

With reference to the eighth possible implementation manner of the second aspect, in a ninth possible implementation manner, the determining $\{L_{2j}\}$ according to a DCI format of the EPDCCH to be detected includes: determining at least one threshold according to the DCI format of the EPDCCH; and determining $\{L_{2j}\}$ according to the at least one threshold.

According to a third aspect, a base station is provided, including a first determining unit, configured to determine a first aggregation level set $\{L_{1i}\}$, and determine the number of EPDCCH candidates corresponding to each aggregation level in the first aggregation level set $\{L_{1i}\}$, where $\{L_{1i}\}$ is formed by N aggregation levels supported by an EPDCCH, i is a positive integer, and a value of i ranges from 1 to N; and a second determining unit, configured to determine a second aggregation level set $\{L_{2j}\}$, and determine the number of EPDCCH candidates corresponding to each aggregation level in the second aggregation level set $\{L_{2j}\}$, where $\{L_{2j}\}$ is formed by M aggregation levels supported by an EPDCCH to be detected, j is a positive integer, a value of j ranges from 1 to M, $\{L_{2j}\}$ is a subset of $\{L_{1i}\}$, M≤N, and the number of EPDCCH candidates corresponding to $L_{2j}$ in $\{L_{2j}\}$ is greater than or equal to the number of EPDCCH candidates corresponding to $L_{2j}$ in $\{L_{1i}\}$.

With reference to the third aspect, in a first possible implementation manner, the second determining unit is specifically configured to determine (N−M) remaining aggregation level after the aggregation levels in $\{L_{2j}\}$ are removed from $\{L_{1i}\}$; determine the total number P of EPDCCH candidates corresponding to the (N−M) aggregation level in $\{L_{1i}\}$; and assign P EPDCCH candidates to the aggregation levels in $\{L_{2j}\}$.

With reference to the first possible implementation manner of the third aspect, in a second possible implementation manner, the second determining unit is specifically configured to assign P1 EPDCCH candidates to the aggregation levels in $\{L_{2j}\}$ in a first time; and assign P2 EPDCCH candidates to the aggregation levels in $\{L_{2j}\}$ in a second time, where P1+P2≤P.

With reference to the second possible implementation manner of the third aspect, in a third possible implementation manner, the second determining unit is specifically configured to evenly assign the P1 EPDCCH candidates to the aggregation levels in $\{L2j\}$.

With reference to the second possible implementation manner of the third aspect, in a fourth possible implementation manner, the second determining unit is specifically configured to assign the P1 EPDCCH candidates according to a ratio of the number of EPDCCH candidates corresponding to each aggregation level of $\{L_{2j}\}$ in $\{L_{1i}\}$ to the total number of EPDCCH candidates corresponding to all the aggregation levels of $\{L_{2j}\}$ in $\{L_{1i}\}$.

With reference to the second possible implementation manner of the third aspect, in a fifth possible implementation manner, the second determining unit is specifically configured to assign the P1 EPDCCH candidates to the aggregation levels in $\{L_{2j}\}$ according to a proportional relationship between N and M.

With reference to the second possible implementation manner of the third aspect, in a sixth possible implementation manner, the second determining unit is specifically configured to cyclically assign one EPDCCH candidate to the aggregation levels in $\{L_{2j}\}$ in sequence according to an ascending order of the aggregation levels; or cyclically assign one EPDCCH candidate to the aggregation levels in $\{L_{2j}\}$ in sequence according to a descending order of the aggregation levels.

With reference to the second possible implementation manner of the third aspect, in a seventh possible implementation manner, the second determining unit is specifically configured to assign the P1 EPDCCH candidates to one aggregation level in $\{L_{2j}\}$.

With reference to the third aspect and any one of the first to seventh possible implementation manners of the third aspect, in an eighth possible implementation manner, the second determining unit is specifically configured to determine $\{L_{2j}\}$ according to a DCI format of the EPDCCH to be detected and/or the number of available resource units of each physical resource block pair corresponding to the EPDCCH to be detected.

With reference to the eighth possible implementation manner of the third aspect, in a ninth possible implementation manner, the second determining unit is specifically configured to determine at least one threshold according to the DCI format of the EPDCCH; and determine $\{L_{2j}\}$ according to the at least one threshold.

According to a fourth aspect, a user equipment is provided, including: a first determining unit, configured to determine a first aggregation level set $\{L_{1i}\}$, and determine the number of blind detection times corresponding to each aggregation level in the first aggregation level set $\{L_{1i}\}$, where $\{L_{1i}\}$ is formed by N aggregation levels supported by an EPDCCH, i is a positive integer, and a value of i ranges from 1 to N; and a second determining unit, configured to determine a second aggregation level set $\{L_{2j}\}$, and determine the number of blind detection times corresponding to each aggregation level in the second aggregation level set $\{L_{2j}\}$, where $\{L_{2j}\}$ is formed by M aggregation levels supported by an EPDCCH to be detected, j is a positive integer, a value of j ranges from 1 to M, $\{L_{2j}\}$ is a subset of $\{L_{1i}\}$, M≤N, and the number of blind detection times corresponding to $L_{2j}$ in $\{L_{2j}\}$ is greater than or equal to the number of blind detection times corresponding to $L_{2j}$ in $\{L_{1i}\}$.

With reference to the fourth aspect, in a first possible implementation manner, the second determining unit is specifically configured to determine (N–M) remaining aggregation level after the aggregation levels in $\{L_{2j}\}$ are removed from $\{L_{1i}\}$; determine the number P of blind detection times corresponding to the (N–M) aggregation level in $\{L_{1i}\}$; and assign P times of blind detection to the aggregation levels in $\{L_{2j}\}$.

With reference to the first possible implementation manner of the fourth aspect, in a second possible implementation manner, the second determining unit is specifically configured to assign P1 times of blind detection to the aggregation levels in $\{L_{2j}\}$ in a first time; and assign P2 times of blind detection to the aggregation levels in $\{L_{2j}\}$ in a second time, where P1+P2≤P.

With reference to the second possible implementation manner of the fourth aspect, in a third possible implementation manner, the second determining unit is specifically configured to evenly assign the P1 times of blind detection to the aggregation levels in $\{L_{2j}\}$.

With reference to the second possible implementation manner of the fourth aspect, in a fourth possible implementation manner, the second determining unit is specifically configured to assign the P1 times of blind detection according to a ratio of the number of blind detection times corresponding to each aggregation level of $\{L_{2j}\}$ in $\{L_{1i}\}$ to the total number of blind detection times corresponding to all the aggregation levels of $\{L_{2j}\}$ in $\{L_{1i}\}$.

With reference to the second possible implementation manner of the fourth aspect, in a fifth possible implementation manner, the second determining unit is specifically configured to assign the P1 times of blind detection to the aggregation levels in $\{L_{2j}\}$ according to a proportional relationship between N and M.

With reference to the second possible implementation manner of the fourth aspect, in a sixth possible implementation manner, the second determining unit is specifically configured to cyclically assign one time of blind detection to the aggregation levels in $\{L_{2j}\}$ in sequence according to an ascending order of the aggregation levels; or cyclically assign one time of blind detection to the aggregation levels in $\{L_{2j}\}$ in sequence according to a descending order of the aggregation levels.

With reference to the second possible implementation manner of the fourth aspect, in a seventh possible implementation manner, the second determining unit is specifically configured to assign the P1 times of blind detection to one aggregation level in $\{L_{2j}\}$.

With reference to the fourth aspect and any one of the first to seventh possible implementation manner of the fourth aspect, in an eighth possible implementation manner, the second determining unit is specifically configured to determine $\{L_{2j}\}$ according to a DCI format of the EPDCCH to be detected and/or the number of available resource units of each physical resource block pair corresponding to the EPDCCH to be detected.

With reference to the eighth possible implementation manner of the fourth aspect, in a ninth possible implementation manner, the second determining unit is specifically configured to determine at least one threshold according to the DCI format of the EPDCCH; and determine $\{L_{2j}\}$ according to the at least one threshold.

In the embodiments of the present invention, the base station reassigns the number of EPDCCH candidates corresponding to an aggregation level not supported by the EPDCCH to be detected, thereby improving the utilization of the EPDCCH candidates. Moreover, the UE reassigns the number of blind detection times corresponding to the aggregation level not supported by the EPDCCH to be detected, thereby improving the utilization of the blind detection times.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied to various communication systems, for example, a global system of mobile communication (GSM), a code division multiple access (CDMA) system, a wideband code division multiple access (WCDMA) system, a general packet radio service (GPRS), an LTE system, an advanced long term evolution (LTE-A) system, a universal mobile telecommunication system (UMTS), and so on.

It should also be understood that, in the embodiments of the present invention, a user equipment (UE) includes but is not limited to a mobile station (MS), a mobile terminal, a mobile telephone, a handset, portable equipment, and the like, and the UE may communicate with one or more core networks through a radio access network (RAN). For example, the UE may be a mobile telephone (or called a "cellular" phone), a computer with a wireless communication function, and the user equipment may also be a portable mobile apparatus, a pocket-sized mobile apparatus, a handheld mobile apparatus, a computer built-in mobile apparatus, or a vehicle-mounted mobile apparatus.

Figure 1:
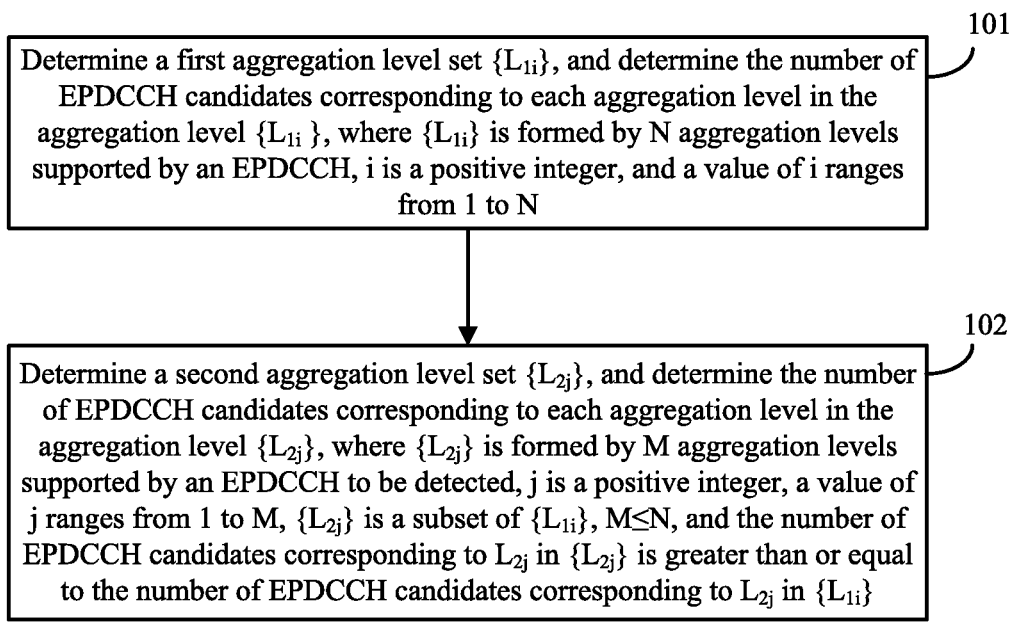
FIG. 1 is a flowchart of a method for assigning the number of control channel candidates according to an embodiment of the present invention.

FIG. 1 is a flowchart of a method for assigning the number of control channel candidates according to an embodiment of the present invention. The method in FIG. 1 is executed by a base station, which, for example, may be an eNB in the LTE technology, and may also be a radio network controller (RNC) in the WCDMA technology.

101: Determine a first aggregation level set $\{L_{1i}\}$, and determine the number of EPDCCH candidates corresponding to each aggregation level in the first aggregation level set $\{L_{1i}\}$, where $\{L_{1i}\}$ is formed by N aggregation levels supported by an EPDCCH, i is a positive integer, and a value of i ranges from 1 to N.

102: Determine a second aggregation level set $\{L_{2j}\}$, and determine the number of EPDCCH candidates corresponding to each aggregation level in the second aggregation level set $\{L_{2j}\}$, where $\{L_{2j}\}$ is formed by M aggregation levels supported by an EPDCCH to be detected, j is a positive integer, a value of j ranges from 1 to M, $\{L_{2j}\}$ is a subset of $\{L_{1i}\}$, $M \leq N$, and the number of EPDCCH candidates corresponding to $L_{2j}$ in $\{L_{2j}\}$ is greater than or equal to the number of EPDCCH candidates corresponding to $L_{2j}$ in $\{L_{1i}\}$.

In the embodiment of the present invention, the base station reassigns the number of EPDCCH candidates corresponding to the aggregation level not supported by the EPDCCH to be detected, thereby improving the utilization of the EPDCCH candidates.

It should be noted that, in the embodiment of the present invention, the number of EPDCCH candidates that the base station needs to assign may be the same as the number of blind detection times of a UE. For example, when the UE supports 32 times of blind detection, the base station may assign 32 EPDCCH candidates to the UE. When the UE employs an uplink MIMO technology, the number of blind detection times that can be supported by the UE is 48, and the base station may assign 48 EPDCCH candidates to the UE. It should be understood that, the number of EPDCCH candidates assigned by the base station may also be different from the number of blind detection times supported by the UE, which is not limited in the embodiment of the present invention.

It should be noted that, the "EPDCCH" in the foregoing expression "N aggregation levels supported by an EPDCCH" is a generalized concept, and may not refer in particular to a certain EPDCCH. Moreover, the base station may determine the N aggregation levels supported by the EPDCCH before actually sending the EPDCCH. The EPDCCH to be detected may be a specific EPDCCH in a certain subframe, and may be an actual physical concept which is about to be sent and includes control information.

Optionally, as an embodiment, step 102 may include: determining (N–M) remaining aggregation level after the aggregation levels in $\{L_{2j}\}$ are removed from $\{L_{1i}\}$; determining the total number P of EPDCCH candidates corresponding to the (N–M) aggregation level in $\{L_{1i}\}$; and assigning P EPDCCH candidates to the aggregation levels in $\{L_{2j}\}$. For example, $\{L_{1i}\}$ is {1, 2, 4, 8, 16}, corresponding to {10, 10, 5, 5, 2} EPDCCH candidates, respectively, and N=5. $\{L_{2j}\}$ is {2, 4, 8, 16}, M=4. (N–M) aggregation level refers to the aggregation level 1. Then, it is determined that the number of EPDCCH candidates corresponding to the aggregation level 1 in the first set is 10, that is to say, P=10, and 10 EPDCCH candidates are assigned to {2, 4, 8, 16} based on a certain rule.

It should be noted that, the present invention does not limit the specific assignment manner for assigning P EPDCCH candidates to the aggregation levels in $\{L_{2j}\}$. The EPDCCH candidates may be assigned evenly, or assigned proportionally, or assigned randomly. In addition, the present invention does not limit the assignment sequence either. The EPDCCH candidates may be assigned according to a descending order of the aggregation levels, or assigned according to an ascending order of the aggregation levels. The EPDCCH candidates may be completely assigned in one time, or assigned in several times.

Optionally, as another embodiment, the assigning P EPDCCH candidates to the aggregation levels in $\{L_{2j}\}$ may include assigning P1 EPDCCH candidates to the aggregation levels in $\{L_{2j}\}$ in a first time; and assigning P2 EPDCCH candidates to the aggregation levels in $\{L_{2j}\}$ in a second time, where P1+P2≤P. It should be understood that, the present invention does not limit the selection of the P1 and P2; P1 and P2 may be determined in advance; or, an assignment rule may be determined in advance, and P2 EPDCCH candidates remain after the assignment based on the rule, while P1 is not determined in advance but is obtained after the assignment based on the rule.

Optionally, as another embodiment, the assigning P1 EPDCCH candidates to the aggregation levels in $\{L_{2j}\}$ in a first time may include evenly assigning P1 EPDCCH candidates to the aggregation levels in $\{L_{2j}\}$.

For example, if $\{L_{2j}\}$ is {2, 4, 8, 16}, and P=10, 10 EPDCCH candidates are evenly assigned to aggregation levels 2, 4, 8, 16 in $\{L_{2j}\}$ in a first time, and then each aggregation level is assigned with 2.5 EPDCCH candidates. However, the number of EPDCCH candidates shall be an integer, and therefore, each aggregation level is assigned with 2 EPDCCH candidates, that is, P1=8, and 2 EPDCCHs remain, that is, P2=2.

Optionally, as another embodiment, the assigning P1 EPDCCH candidates to the aggregation levels in $\{L_{2j}\}$ in a first time may include: assigning the P1 EPDCCH candidates according to a ratio of the number of EPDCCH candidates corresponding to each aggregation level of $\{L_{2j}\}$ in $\{L_{1i}\}$ to the total number of EPDCCH candidates corresponding to all the aggregation levels of $\{L_{2j}\}$ in $\{L_{1i}\}$.

Optionally, as another embodiment, the assigning P1 EPDCCH candidates to the aggregation levels in $\{L_{2j}\}$ in a first time may include assigning the P1 EPDCCH candidates to the aggregation levels in $\{L_{2j}\}$ according to a proportional relationship between N and M.

Optionally, as another embodiment, the assigning P1 EPDCCH candidates to the aggregation levels in $\{L_{2j}\}$ in a first time may include: assigning the P1 EPDCCH candidates to one aggregation level in $\{L_{2j}\}$.

It should be noted that, the embodiment of the present invention does not limit the assignment manner of P2. The P2 EPDCCH candidates may be assigned based on a certain rule, or assigned randomly; a part of the P2 EPDCCH candidates may be assigned first, and then the rest are assigned; the P2 EPDCCH candidates may be assigned completely, or some of the P2 EPDCCH candidates may remain.

Optionally, as another embodiment, the assigning P2 EPDCCH candidates to the aggregation levels in $\{L_{2j}\}$ in a second time may include: cyclically assigning one EPDCCH candidate to each aggregation level in $\{L_{2j}\}$ in sequence according to an ascending order of the aggregation levels; or cyclically assigning one EPDCCH candidate to each aggregation level in $\{L_{2j}\}$ in sequence according to a descending order of the aggregation levels.

It should be understood that, when P2 is greater than the number of aggregation levels in $\{L_{2j}\}$, after one EPDCCH candidate is assigned to each aggregation level in $\{L_{2j}\}$ based on the foregoing rule, remaining EPDCCH candidates among P2 EPDCCH candidates may be assigned based on the same rule, that is, the assignment is performed cyclically in sequence.

Optionally, as another embodiment, the determining a second aggregation level set $\{L_{2j}\}$ may include determining $\{L_{2j}\}$ according to a DCI format of the EPDCCH to be detected and/or the number of available resource units of each physical resource block pair corresponding to the EPDCCH to be detected.

Optionally, as another embodiment, the determining $\{L_{2j}\}$ according to a DCI format of the EPDCCH to be detected may include determining at least one threshold according to the DCI format of the EPDCCH; and determining $\{L_{2j}\}$ according to the at least one threshold.

For example, the base station may determine a first threshold for an EPDCCH transmitted in DCI format 1A, and the first threshold may also be used for an EPDCCH transmitted in DCI format series 2X.

Optionally, the base station may also determine a second threshold for the EPDCCH transmitted in DCI format series 2X, and the second threshold may also be used for the EPDCCH transmitted in DCI format 1A; or, the base station re-determines a third threshold met by both the EPDCCH transmitted in the DCI format 1A and the EPDCCH transmitted in the DCI format series 2X. It should be understood that, when the second threshold or the third threshold is used, both of the thresholds can ensure that the EPDCCH transmitted in the DCI format series 2X meets a transmission code rate requirement, and therefore, the EPDCCH transmitted in DCI format 1A meets the transmission code rate requirement even better. In this case, the number of blind detection times may be assigned, based on a predetermined rule, to the aggregation levels determined according to the foregoing thresholds.

Optionally, as another embodiment, the base station may determine a first threshold for an EPDCCH transmitted in the DCI format 1A, and determine a second threshold for an EPDCCH transmitted in the DCI format series 2X. Through determining different thresholds for different transmission formats, determined aggregation levels that can be supported by EPDCCHs to be detected may be different.

It should be noted that, in the embodiment of the present invention, it is also possible that a part of EPDCCH candidates corresponding to one or some aggregation levels among the aggregation levels supported by the EPDCCH to be detected do not support the transmission of a certain EPDCCH which is to be detected and with the DCI transmission format, and the rest support the transmission of the EPDCCH with the DCI transmission format. In this case, the number of candidates corresponding to this part of EPDCCH candidates may also be reassigned. The embodiment of the present invention does not limit the reassignment principle, which may be any one of or a combination of multiple principles mentioned in the embodiments of the present invention, and may also be a new principle. The present invention does not limit the object of the reassignment either. The object may or may not include the foregoing one or some aggregation levels.

Optionally, as another embodiment, N=5, and the N aggregation levels are {1, 2, 4, 8, 16}. It is assumed that the aggregation level 1 has been assigned with 10 EPDCCH candidates. For failing to meet the code rate requirement, the aggregation level 1 cannot be used for transmitting EPDCCHs with the DCI format series 2X, and all other aggregation levels meet the code rate requirement. In this case, N−M=1, the (N−M) aggregation level is {1}, P=10, M=4, and the M aggregation levels are {2, 4, 8, 16}. The base station may assign 10 EPDCCH candidates to the 4 remaining aggregation levels {2, 4, 8, 16}.

Optionally, as another embodiment, N=4, N aggregation levels are {2, 4, 8, 16}, and all the aggregation levels meet the code rate requirement. It is assumed that the aggregation level 2 has been assigned with 4 EPDCCH candidates, but 2 EPDCCH candidates in the aggregation level 2 do not meet the code rate requirement. In this case, (N–M) may be equal to 1, the (N–M) aggregation level is {2}, P=2, M=3, and the M aggregation levels are {4, 8, 16}. The base station may assign 2 EPDCCH candidates to the 3 remaining aggregation levels {4, 8, 16}.

Optionally, as another embodiment, N=5, and N aggregation levels are {1, 2, 4, 8, 16}. It is assumed that the aggregation level 1 and the aggregation level 2 each correspond to 10 EPDCCH candidates. The aggregation level 1 does not meet the code rate requirement, and 5 EPDCCH candidates in the aggregation level 2 do not meet the code rate requirement. In this case, N-M=1, the (N–M) aggregation level is {1}, P=15, M=4, and the M aggregation levels are {2, 4, 8, 16}. The base station may assign 15 EPDCCH candidates to the 4 remaining aggregation levels {2, 4, 8, 16}.

Optionally, an aggregation level corresponding to the P1 EPDCCH candidates is used as (N–M) aggregation level. For example, N=5, and N aggregation levels are {1, 2, 4, 8, 16}. In this case, the aggregation level 1 does not meet the code rate requirement, and 2 EPDCCH candidates in the aggregation level 2 do not meet the code rate requirement; then, it is determined that N-M=2, and the (N–M) aggregation levels are {1, 2}.

Figure 2:
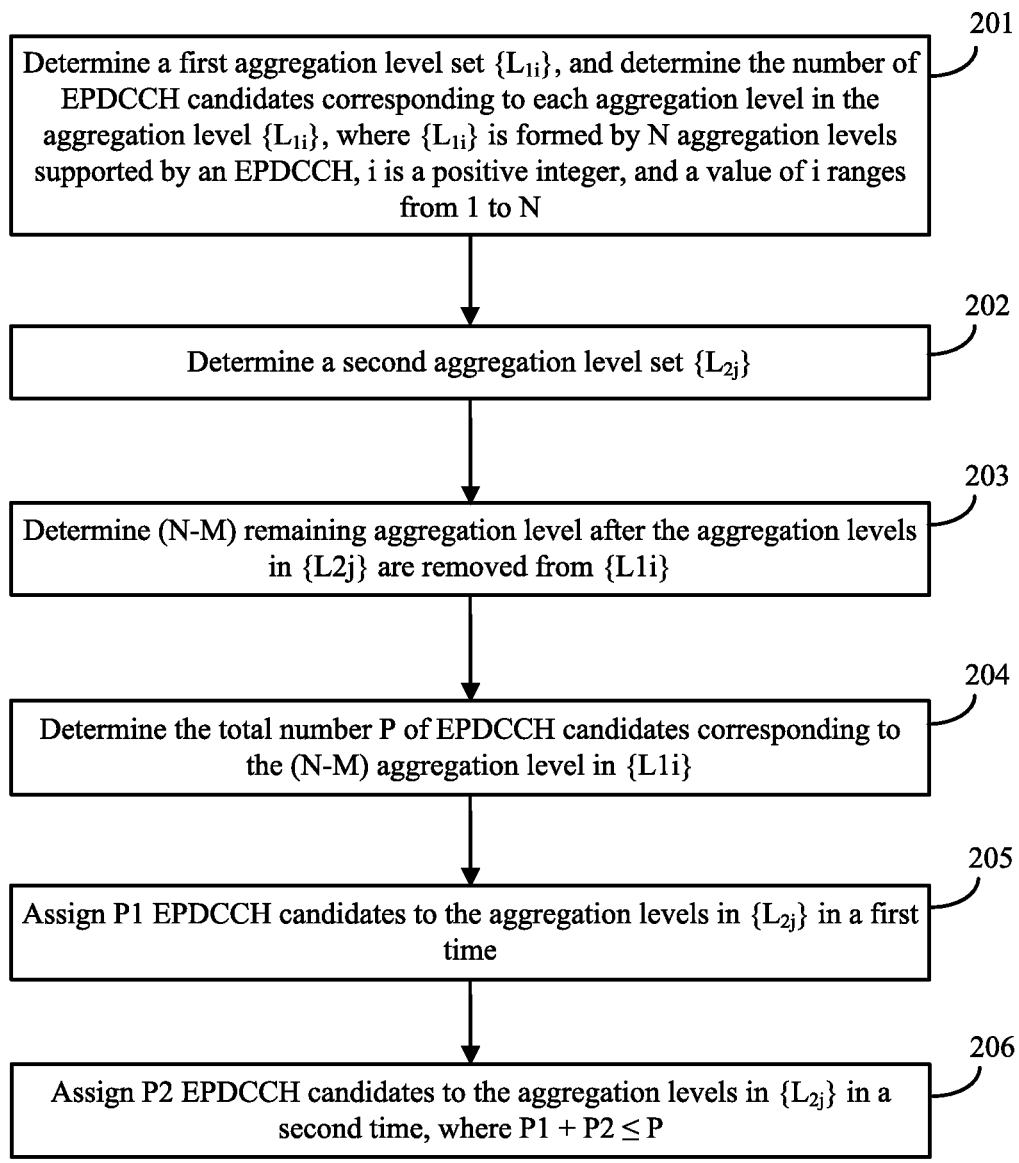
FIG. 2 is a flowchart of a method for assigning the number of control channel candidates according to another embodiment of the present invention.

FIG. 2 is a flowchart of a method for assigning the number of control channel candidates according to another embodiment of the present invention. The method in FIG. 2 is executed by a base station. The embodiment in FIG. 2 is a more specific implementation manner of the embodiment in FIG. 1, and therefore, detailed descriptions are properly omitted herein.

201: Determine a first aggregation level set $\{L_{1i}\}$, and determine the number of EPDCCH candidates corresponding to each aggregation level in the first aggregation level set $\{L_{1i}\}$, where $\{L_{1i}\}$ is formed by N aggregation levels supported by an EPDCCH, i is a positive integer, and a value of i ranges from 1 to N.

202: Determine a second aggregation level set $\{L_{2j}\}$.

203: Determine (N–M) remaining aggregation level after the aggregation levels in $\{L_{2j}\}$ are removed from $\{L_1\}$.

204: Determine the total number P of EPDCCH candidates corresponding to the (N–M) aggregation level in $\{L_1\}$.

205: Assign P1 EPDCCH candidates to the aggregation levels in $\{L_{2j}\}$ in a first time.

206: Assign P2 EPDCCH candidates to the aggregation levels in $\{L_{2j}\}$ in a second time, where P1+P2≤P.

In the embodiment of the present invention, the base station reassigns the number of EPDCCH candidates corresponding to the aggregation level not supported by the EPDCCH to be detected, thereby improving the utilization of the EPDCCH candidates.

Figure 3:
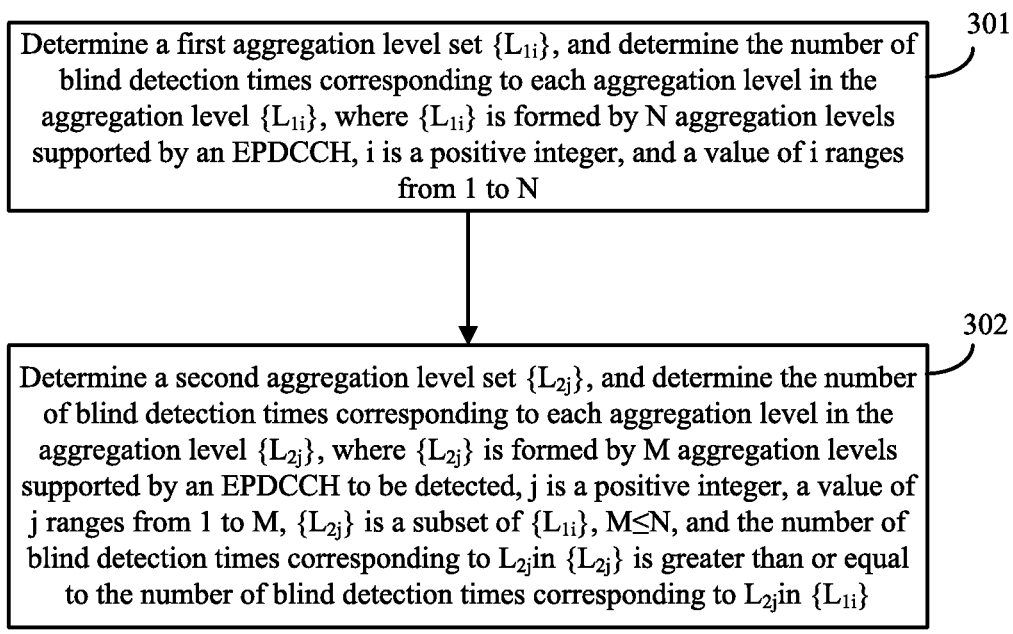
FIG. 3 is a flowchart of a method for assigning the number of blind detection times according to an embodiment of the present invention.

FIG. 3 is a flowchart of a method for assigning the number of blind detection times according to an embodiment of the present invention. The method in FIG. 3 is executed by a UE. The embodiment in FIG. 3 is corresponding to the embodiment in FIG. 1. The difference between the executor, the base station, in FIG. 1 and the executor, the UE, in FIG. 3 is that the assigned objects are different. The base station assigns the EPDCCH candidates, and the UE assigns the number of blind detection times. The assignment manners may be the same or corresponding to each other, and therefore, detailed descriptions are omitted herein.

301: Determine a first aggregation level set $\{L_{1i}\}$, and determine the number of blind detection times corresponding to each aggregation level in the first aggregation level set $\{L_{1i}\}$, where $\{L_{1i}\}$ is formed by N aggregation levels supported by an EPDCCH, i is a positive integer, and a value of i ranges from 1 to N.

302: Determine a second aggregation level set $\{L_{2j}\}$, and determine the number of blind detection times corresponding to each aggregation level in the second aggregation level set $\{L_{2j}\}$, where $\{L_{2j}\}$ is formed by M aggregation levels supported by an EPDCCH to be detected, j is a positive integer, a value of j ranges from 1 to M, $\{L_{2j}\}$ is a subset of $\{L_{1i}\}$, M≤N, and the number of blind detection times corresponding to $L_{2j}$ in $\{L_{2j}\}$ is greater than or equal to the number of blind detection times corresponding to $L_{2j}$ in $\{L_{1i}\}$.

In the embodiment of the present invention, the UE reassigns the number of blind detection times corresponding to an aggregation level that is not supported by the EPDCCH to be detected, thereby improving the utilization of the blind detection times.

Optionally, as an embodiment, the determining the number of blind detection times corresponding to each aggregation level in the aggregation level $\{L_{2j}\}$ may include: determining (N–M) remaining aggregation level after the aggregation levels in $\{L_{2j}\}$ are removed from $\{L_{1i}\}$; determining the number P of blind detection times corresponding to the (N–M) aggregation level in $\{L_{1i}\}$; and assigning P times of blind detection to the aggregation levels in $\{L_{2j}\}$.

Optionally, as another embodiment, the assigning P times of blind detection to the aggregation levels in $\{L_{2j}\}$ may include: assigning P1 times of blind detection to the aggregation levels in $\{L_{2j}\}$ in a first time; and assigning P2 times of blind detection to the aggregation levels in $\{L_{2j}\}$ in a second time, where P1+P2≤P.

Optionally, as another embodiment, the assigning P1 times of blind detection to the aggregation levels in $\{L_{2j}\}$ in a first time may include: evenly assigning P1 times of blind detection to the aggregation levels in $\{L_{2j}\}$.

Optionally, as another embodiment, the assigning P1 times of blind detection to the aggregation levels in $\{L_{2j}\}$ in a first time may include: assigning the P1 times of blind detection according to a ratio of the number of blind detection times corresponding to each aggregation level of $\{L_{2j}\}$ in $\{L_{1i}\}$ to the total number of blind detection times corresponding to all the aggregation levels of $\{L_{2j}\}$ in $\{L_{1i}\}$.

Optionally, as another embodiment, the assigning P1 times of blind detection to the aggregation levels in $\{L_{2j}\}$ in a first time may include: assigning P1 times of blind detection to the aggregation levels in $\{L_{2j}\}$ according to a proportional relationship between N and M.

Optionally, as another embodiment, the assigning P2 times of blind detection to the aggregation levels in $\{L_{2j}\}$ in a second time may include: cyclically assigning one time of blind detection to each aggregation level in $\{L_{2j}\}$ in sequence according to an ascending order of the aggregation levels; or cyclically assigning one time of blind detection to each aggregation level in $\{L_{2j}\}$ in sequence according to a descending order of the aggregation levels.

Optionally, as another embodiment, the assigning P1 times of blind detection to the aggregation levels in $\{L_{2j}\}$ in a first time may include: assigning P1 times of blind detection to one aggregation level in $\{L_{2j}\}$.

Optionally, as another embodiment, the determining a second aggregation level set $\{L_{2j}\}$ may include: determining $\{L_{2j}\}$ according to a DCI format of the EPDCCH to be detected and/or the number of available resource units of each physical resource block pair corresponding to the EPDCCH to be detected.

Optionally, as another embodiment, the determining $\{L_{2j}\}$ according to a DCI format of the EPDCCH to be detected may include: determining at least one threshold according to the DCI format of the EPDCCH; and determining $\{L_{2j}\}$ according to the at least one threshold.

Optionally, as another embodiment, it is assumed that the total number of aggregation levels that can be supported by the UE is K, and the total number of blind detection times is 32 (the total number of blind detection times may be 48 in the case of UL MIMO). The total number of blind detection times is assigned to the K aggregation levels based on a certain predetermined rule, to obtain an assignment result 1 of the K aggregation levels. When the number of aggregation levels that actually can be supported by the UE declines from K to T, where T≤K, the number of blind detection times corresponding to the (K-T) aggregation levels that are not supported are assigned to the T aggregation levels, to obtain an assignment result 2 of the T aggregation levels.

For example, for a normal subframe and a normal cyclic prefix, or a special subframe configuration 3, 4, or 8, when the number of valid resource units in each physical resource block pair is less than 104, a set of aggregation levels that can be supported by the UE is S1={2, 4, 8, 16}; otherwise, a set of aggregation levels that can be supported is S2={1, 2, 4, 8, 16}. In this case, the assignment of the number of blind detection times for the aggregation levels in S1 is based on the assignment of the number of blind detection times for the aggregation levels in S2. That is, the number of blind detection times corresponding to the aggregation level 1 in S2 is assigned to each aggregation level in the set S1 based on a certain preset rule. This rule may be one or more rules in the embodiment of the present invention. Based on this method, the assignment of the number of blind detection times corresponding to all other cases in the right area of Table 1 may be used as blind detection assignment 1, and the assignment of the number of blind detection times corresponding to the aggregation levels {2, 4, 8, 16} in the left area of Table 1 is obtained from the blind detection assignment 1 of the aggregation levels {1, 2, 4, 8, 16} in the right area.

401: Determine a first aggregation level set $\{L_{1i}\}$, and determine the number of blind detection times corresponding to each aggregation level in the first aggregation level set $\{L_{1i}\}$, where $\{L_{1i}\}$ is formed by N aggregation levels supported by an EPDCCH, i is a positive integer, and a value of i ranges from 1 to N.

402: Determine a second aggregation level set $\{L_{2j}\}$.

403: Determine (N-M) remaining aggregation level after the aggregation levels in $\{L_{2j}\}$ are removed from $\{L_{1i}\}$.

404: Determine the total number P of blind detection times corresponding to the (N-M) aggregation level in $\{L_{1i}\}$.

405: Assign P1 times of blind detection to the aggregation levels in $\{L_{2j}\}$ in a first time.

406: Assign P2 times of blind detection to the aggregation levels in $\{L_{2j}\}$ in a second time, where P1+P2≤P.

In the embodiment of the present invention, the UE reassigns the number of blind detection times corresponding to an aggregation level that is not supported by the EPDCCH to be detected, thereby improving the utilization of the blind detection times.

Figure 5:
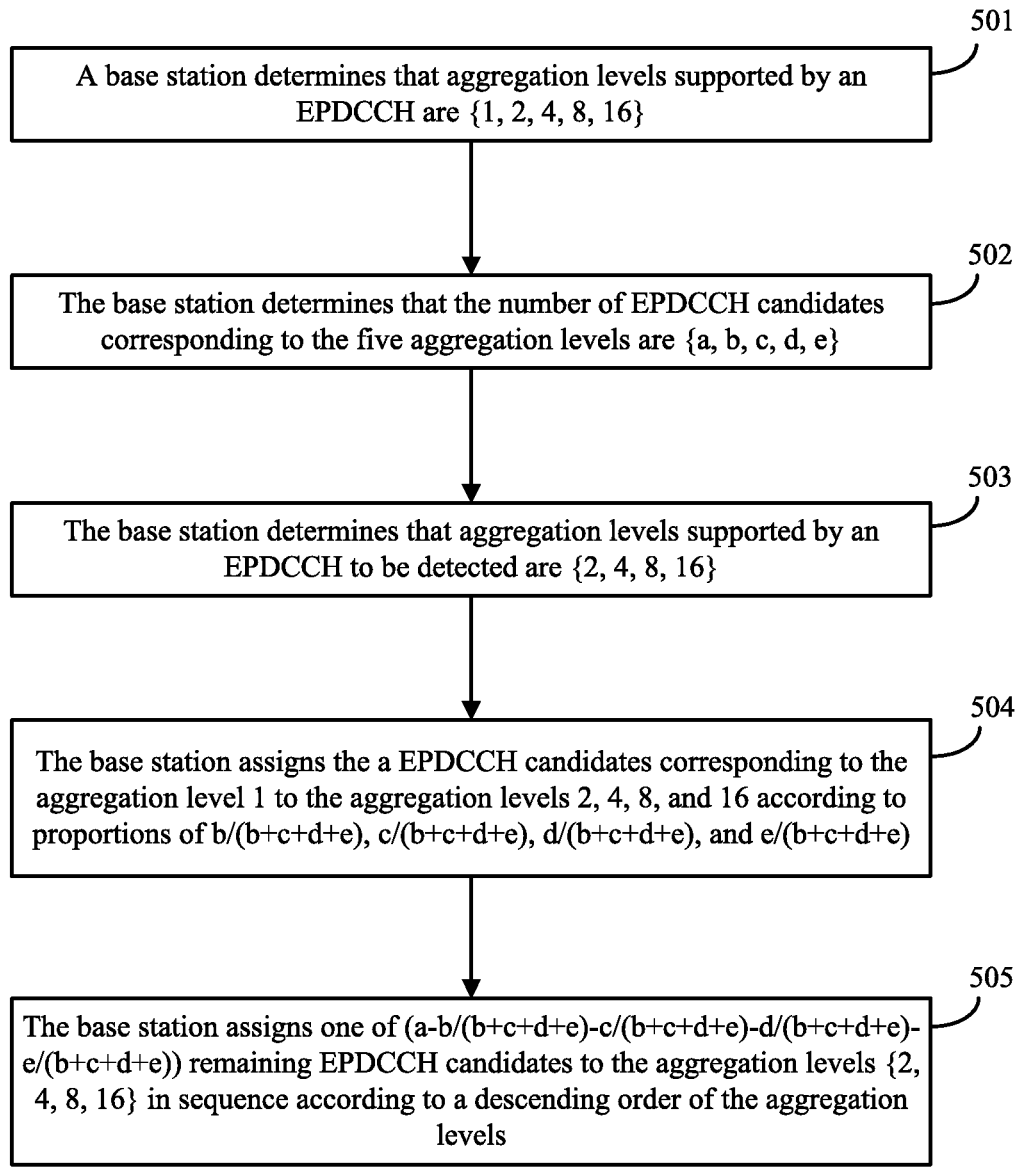
FIG. 5 is a flowchart of a method for assigning the number of control channel candidates according to another embodiment of the present invention.

FIG. 5 is a flowchart of a method for assigning the number of control channel candidates according to another embodiment of the present invention.

501: A base station determines that aggregation levels supported by an EPDCCH are {1, 2, 4, 8, 16}. {1, 2, 4, 8, 16} correspond to the first aggregation levels in the method in FIG. 1, and the number of first aggregation levels is N=5.

502: The base station determines that the number of EPDCCH candidates corresponding to the five aggregation levels are { a, b, c, d, e}.

That is, the aggregation level 1 is assigned with a EPDCCH candidates, the aggregation level 2 is assigned with b EPDCCH candidates, the aggregation level 4 is assigned with c EPDCCH candidates, the aggregation level 8 is assigned with d EPDCCH candidates, and the aggregation level 16 is assigned with e EPDCCH candidates.

503: The base station determines that aggregation levels supported by an EPDCCH to be detected are {2, 4, 8, 16}. {2, 4, 8, 16} correspond to the second aggregation levels in the method in FIG. 1, and the number of second aggregation levels is M=4.

504: The base station assigns the EPDCCH candidates corresponding to the aggregation level 1 to the aggregation levels 2, 4, 8, and 16 according to proportions of b/(b+c+d+e), c/(b+c+d+e), d/(b+c+d+e), and e/(b+c+d+e). That is, the aggregation level 2 is assigned with:

TABLE 1

| | | | | Normal subframes or special subframes 3, 4, 8 (normal CP) | | | | All other cases | | | | |
|---|---|---|---|---|---|---|---|---|---|---|---|---|
| ND | NL | N1 | N2 | AL = 2 | AL = 4 | AL = 8 | AL = 16 | AL = 1 | AL = 2 | AL = 4 | AL = 8 | AL = 16 |
| 1 | 0 | 8 | 0 | 7 | 3 | 3 | 3 | 4 | 6 | 2 | 2 | 2 |
| | | 4 | 0 | 7 | 4 | 3 | 2 | 4 | 6 | 3 | 2 | 1 |
| | | 2 | 0 | 6 | 4 | 3 | 2 | 8 | 4 | 2 | 1 | 0 |

Figure 4:
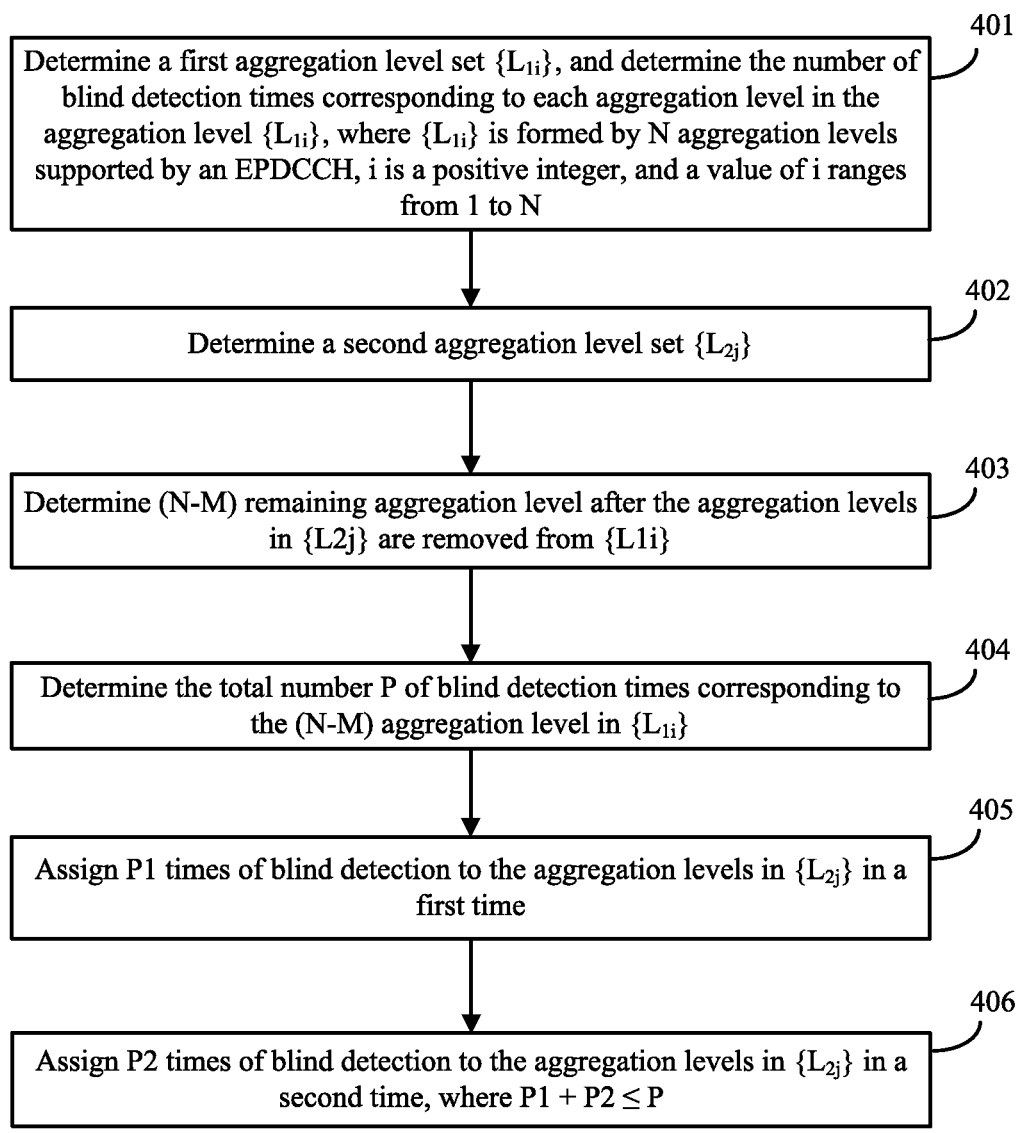
FIG. 4 is a flowchart of a method for assigning the number of blind detection times according to another embodiment of the present invention.

FIG. 4 is a flowchart of a method for assigning the number of blind detection times according to another embodiment of the present invention. The method in FIG. 4 is executed by an UE.

$$b' = \left\lfloor a \times \frac{b}{b+c+d+e} \right\rfloor; \quad (1)$$

the aggregation level 4 is assigned with:

$$c' = \left\lfloor a \times \frac{c}{b+c+d+e} \right\rfloor; \quad (2)$$

the aggregation level 8 is assigned with:

$$d' = \left\lfloor a \times \frac{d}{b+c+d+e} \right\rfloor; \quad (3)$$

the aggregation level 16 is assigned with:

$$e' = \left\lfloor a \times \frac{e}{b+c+d+e} \right\rfloor; \quad (4)$$

It should be noted that, if a decimal occurs during the assignment based on the foregoing method, an integer part is used as the assigned number of times. For example, if e'=2.5, 2 is used as the assigned number of times.

505: The base station assigns one of (a−b/(b+c+d+e)−c/(b+c+d+e)−d/(b+c+d+e)−e/(b+c+d+e)) remaining EPDCCH candidates to the aggregation levels {2, 4, 8, 16} in sequence according to a descending order of the aggregation levels.

First, the number of remaining blind detection times is calculated:

$$R = (a - b' - c' - d' - e') \quad (5)$$

Assuming that R=3, one EPDCCH candidate is assigned to the aggregation levels 16, 8, and 4 in sequence, and a final assignment result of the a EPDCCH candidates is as follows.

A more generalized assignment criterion may be expressed as follows: it is assumed that aggregation levels that can be supported by an enhanced control channel determined according to a certain threshold are L1, L2, ..., Lk, where the numbers of candidates corresponding to the aggregation levels are $M_{L1}, M_{L2}, \ldots, M_{Lk}$, respectively. It is assumed that the aggregation level Li cannot meet a code rate requirement of an enhanced control channel with a certain DCI format; a user terminal skips the detection of this aggregation level, and at the same time assigns the number $M_{Li}$ of blind detection times corresponding to this aggregation level to other aggregation levels that meet the condition. The number of blind detection times of the $j^{th}$ aggregation level after the first assignment is:

$$M'_{Lj} = M_{Lj} + \left\lfloor M_{Li} \times \frac{M_{Lj}}{\sum_{t \neq i} M_{Lt}} \right\rfloor \quad (6)$$

The number of remaining blind detection times after the first assignment is:

$$R = \left( M_{Li} - \sum_{t \neq i} (M'_{Lt} - M_{Lt}) \right) \quad (7)$$

R is evenly assigned to the other aggregation levels that meet the condition from a high aggregation level to a low aggregation level.

When the number of aggregation levels that do not meet the condition is greater than 1, the $M_{Li}$ in the foregoing formula (6) is corresponding to the total number of candidates of all the aggregation levels that do not meet the condition.

In the embodiment of the present invention, the base station reassigns the number of EPDCCH candidates corresponding to the aggregation level not supported by the EPDCCH to be detected, thereby improving the utilization of the EPDCCH candidates.

Figure 6:
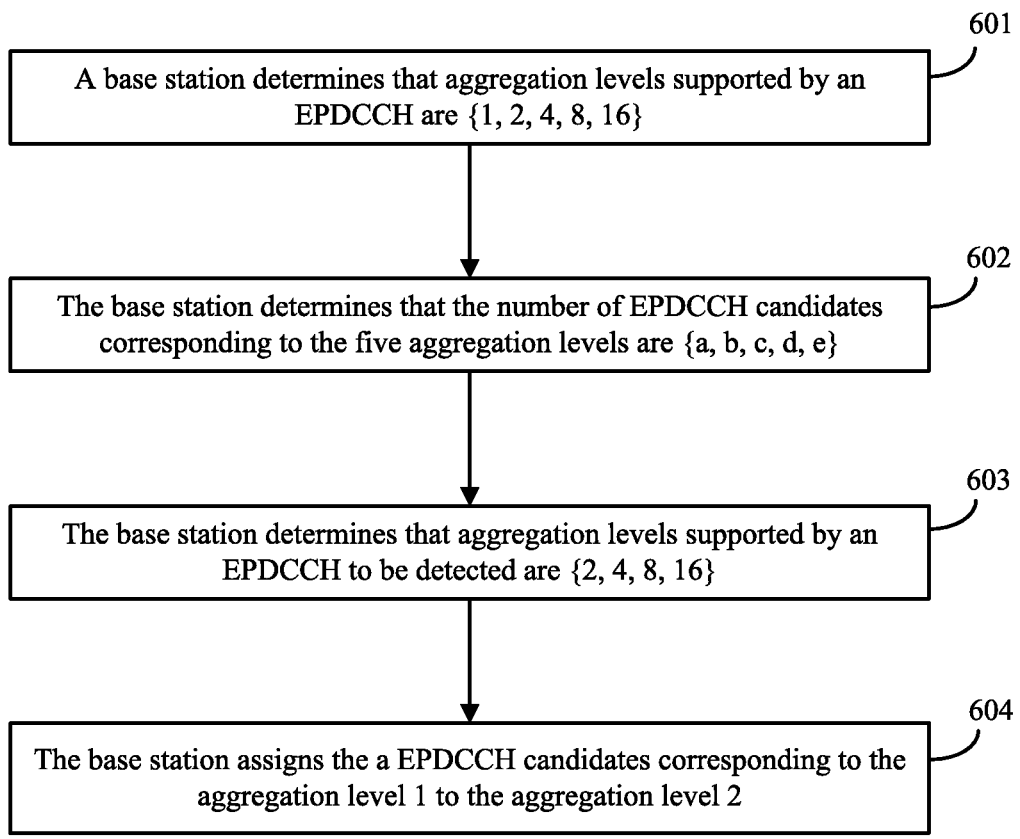
FIG. 6 is a flowchart of a method for assigning the number of control channel candidates according to another embodiment of the present invention.

FIG. 6 is a flowchart of a method for assigning the number of control channel candidates according to another embodiment of the present invention.

601: A base station determines that aggregation levels supported by an EPDCCH are {1, 2, 4, 8, 16}. {1, 2, 4, 8, 16} correspond to the first aggregation levels in the method in FIG. 1, and the number of first aggregation levels is N=5.

602: The base station determines that the number of EPDCCH candidates corresponding to the five aggregation levels are { a, b, c, d, e}.

That is, the aggregation level 1 is assigned with a EPDCCH candidates, the aggregation level 2 is assigned with b EPDCCH candidates, the aggregation level 4 is assigned with c EPDCCH candidates, the aggregation level 8 is assigned with d EPDCCH candidates, and the aggregation level 16 is assigned with e EPDCCH candidates.

603: The base station determines that aggregation levels supported by an EPDCCH to be detected are {2, 4, 8, 16}. {2, 4, 8, 16} correspond to the second aggregation levels in the method in FIG. 1, and the number of second aggregation levels is M=4.

604: The base station assigns the a EPDCCH candidates corresponding to the aggregation level 1 to the aggregation level 2.

It should be understood that, the aggregation level 2 to which the a EPDCCH candidates are assigned is merely an aggregation level selected from the second set, and may also be any aggregation level in the second set.

A more generalized assignment criterion may be expressed as follows: it is assumed that aggregation levels that can be supported by an enhanced control channel determined according to a certain threshold are L1, L2, ..., Lk, where the numbers of candidates corresponding to the aggregation levels are $M_{L1}, M_{L2}, \ldots, M_{Lk}$, respectively. It is assumed that the aggregation level Li cannot meet a code rate requirement of an enhanced control channel with a certain DCI format. A user terminal skips the detection of this aggregation level, and at the same time assigns the number of blind detection times $M_{Li}$ corresponding to this aggregation level to a certain aggregation level among the other aggregation levels that meet the condition.

In the embodiment of the present invention, the base station reassigns the number of EPDCCH candidates corresponding to the aggregation level not supported by the EPDCCH to be detected, thereby improving the utilization of the EPDCCH candidates.

Figure 7:
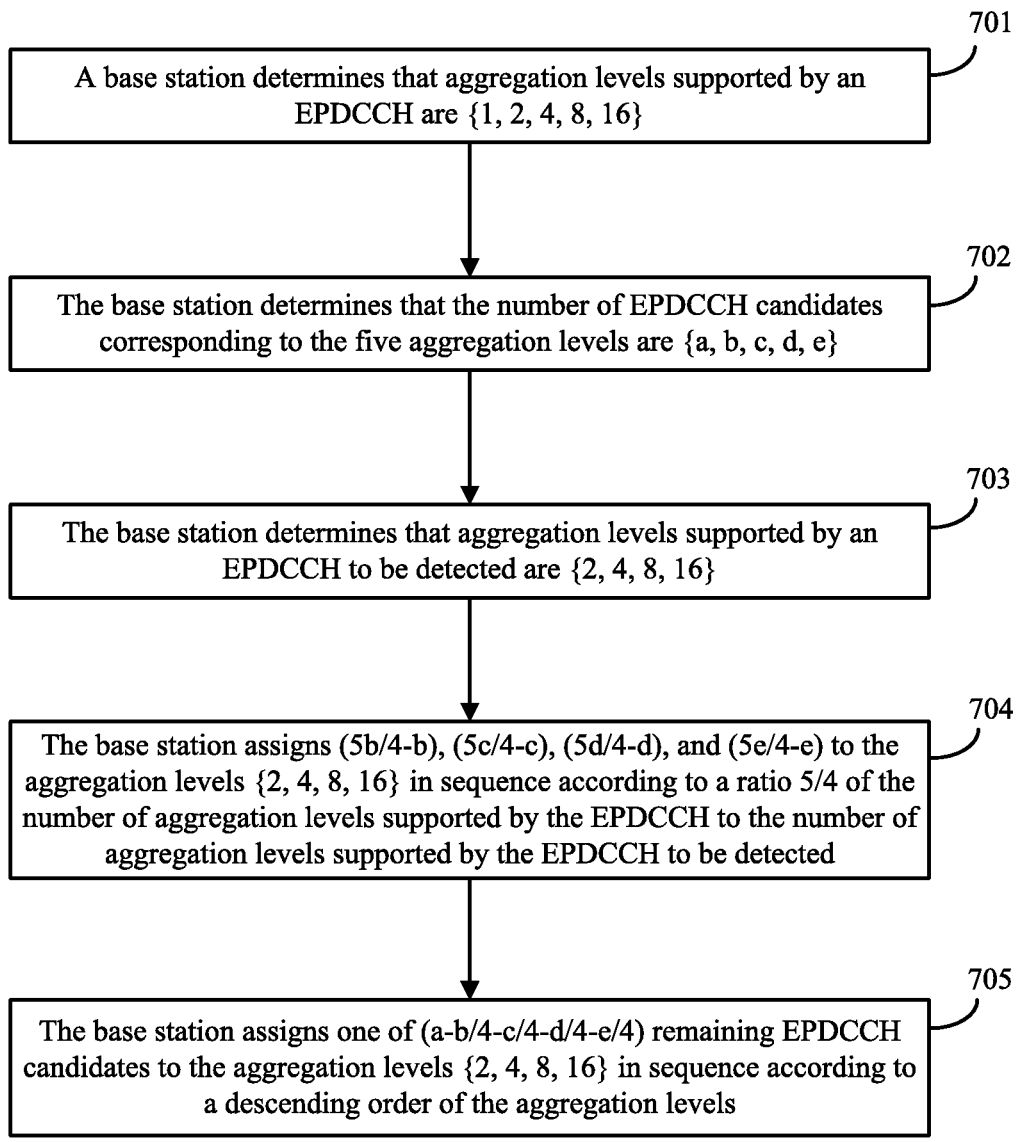
FIG. 7 is a flowchart of a method for assigning the number of control channel candidates according to another embodiment of the present invention.

FIG. 7 is a flowchart of a method for assigning the number of control channel candidates according to another embodiment of the present invention.

701: A base station determines that aggregation levels supported by an EPDCCH are {1, 2, 4, 8, 16}. {1, 2, 4, 8, 16} correspond to the first aggregation levels in the method in FIG. 1, and the number of first aggregation levels is N=5.

702: The base station determines that the number of EPDCCH candidates corresponding to the five aggregation levels are { a, b, c, d, e}.

That is, the aggregation level 1 is assigned with a EPDCCH candidates, the aggregation level 2 is assigned with b EPDCCH candidates, the aggregation level 4 is assigned with c EPDCCH candidates, the aggregation level 8 is assigned with d EPDCCH candidates, and the aggregation level 16 is assigned with e EPDCCH candidates.

703: The base station determines that aggregation levels supported by an EPDCCH to be detected are {2, 4, 8, 16}. {2, 4, 8, 16} correspond to the second aggregation levels in the method in FIG. 1, and the number of second aggregation levels is M=4.

704: The base station assigns (5b/4−b), (5c/4−c), (5d/4−d), and (5e/4−e) to the aggregation levels {2, 4, 8, 16} in sequence according to a ratio 5/4 of the number of aggregation levels supported by the EPDCCH to the number of aggregation levels supported by the EPDCCH to be detected:

that is, the aggregation level 2 is assigned with:

$$b' = \lfloor b \times 5/4 - b \rfloor \quad (8)$$

the aggregation level 4 is assigned with:

$$c' = \lfloor c \times 5/4 - c \rfloor \quad (9)$$

the aggregation level 8 is assigned with:

$$d' = \lfloor d \times 5/4 - d \rfloor \quad (10)$$

the aggregation level 16 is assigned with:

$$e' = \lfloor e \times 5/4 - e \rfloor \quad (11)$$

It should be noted that, during an actual assignment process, the EPDCCH candidates may be assigned according to a descending order or an ascending order of the aggregation levels. When the EPDCCH candidates are completely assigned at a certain aggregation level, the assignment stops.

705: The base station assigns one of (a−b'−c'−d'−e') remaining EPDCCH candidates to the aggregation levels {2, 4, 8, 16} in sequence according to a descending order of the aggregation levels.

The number of remaining EPDCCH candidates is $$R = (a - b' - c' - d' - e') \quad (12)$$

A more generalized assignment criterion may be expressed as follows. It is assumed that aggregation levels that can be supported by an enhanced control channel determined according to a certain threshold are L1, L2, . . . , Lk (the total number of aggregation levels is k), where the numbers of candidates corresponding to the aggregation levels are $M_{L1}, M_{L2}, \ldots, M_{Lk}$, respectively. It is assumed that the aggregation level Li cannot meet a code rate requirement of an enhanced control channel with a certain DCI format; a user terminal skips the detection of this aggregation level, and at the same time assigns the number $M_{Li}$ of blind detection times corresponding to this aggregation level to other aggregation levels (the total number of aggregation levels is m) that meet the condition. The number of blind detection times of the $j^{th}$ aggregation level after the first assignment is:

$$M'_{Lj} = \left\lfloor M_{Lj} \times \frac{m}{k} \right\rfloor \quad (13)$$

The number of remaining blind detection times after the first assignment is:

$$R = \left( M_{Li} - \sum_{t \neq i} (M'_{Lt} - M_{Lt}) \right) \quad (14)$$

R is evenly assigned to the other aggregation levels that meet the condition starting from a low aggregation level or a high aggregation level.

In the embodiment of the present invention, the base station reassigns the number of EPDCCH candidates corresponding to the aggregation level not supported by the EPDCCH to be detected, thereby improving the utilization of the EPDCCH candidates.

Figure 8:
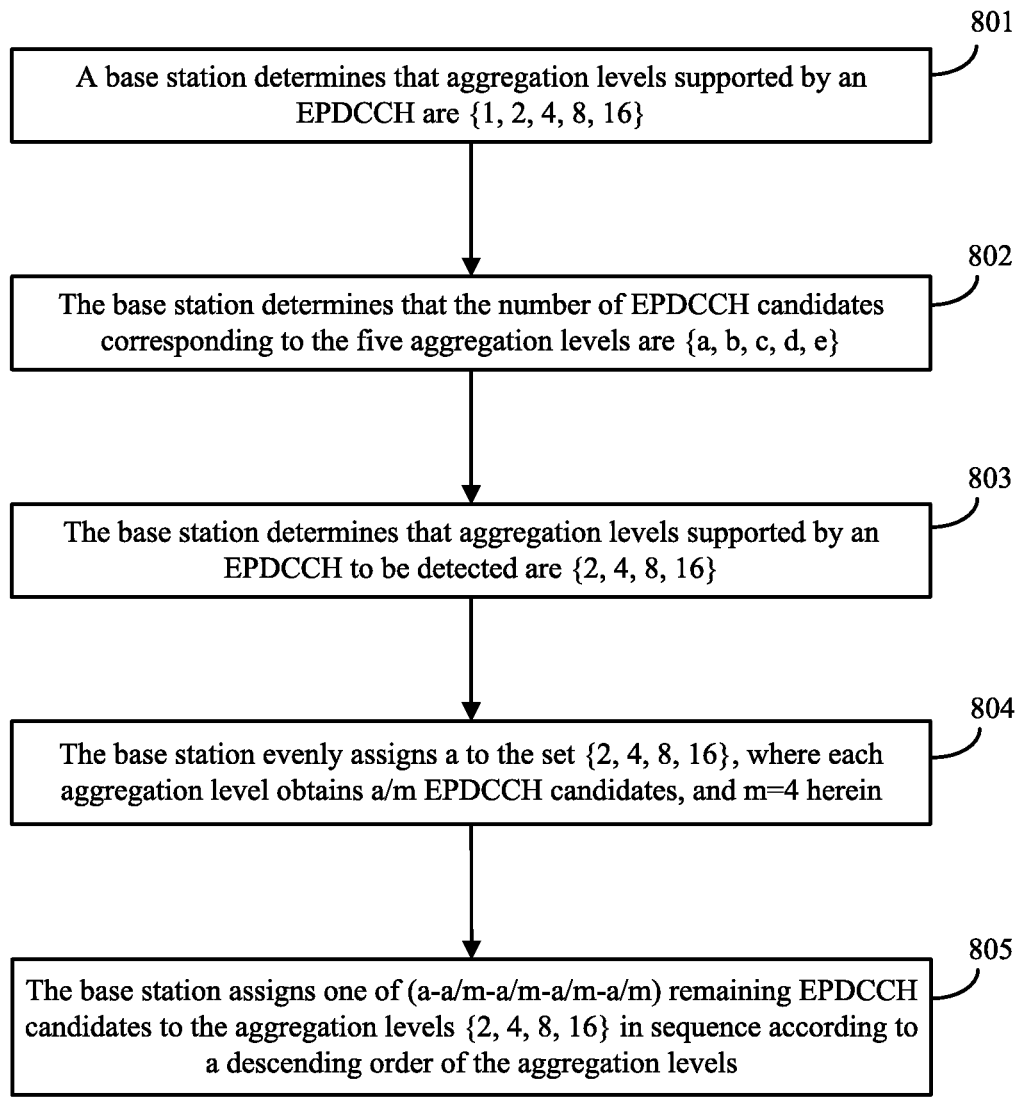
FIG. 8 is a flowchart of a method for assigning the number of control channel candidates according to another embodiment of the present invention.

FIG. 8 is a flowchart of a method for assigning the number of control channel candidates according to another embodiment of the present invention.

801: A base station determines that aggregation levels supported by an EPDCCH are {1, 2, 4, 8, 16}. {1, 2, 4, 8, 16} correspond to the first aggregation levels in the method in FIG. 1, and the number of first aggregation levels is N=5.

802: The base station determines that the number of EPDCCH candidates corresponding to the five aggregation levels are { a, b, c, d, e}.

That is, the aggregation level 1 is assigned with a EPDCCH candidates, the aggregation level 2 is assigned with b EPDCCH candidates, the aggregation level 4 is assigned with c EPDCCH candidates, the aggregation level 8 is assigned with d EPDCCH candidates, and the aggregation level 16 is assigned with e EPDCCH candidates.

803: The base station determines that aggregation levels supported by an EPDCCH to be detected are {2, 4, 8, 16}. {2, 4, 8, 16} correspond to the second aggregation levels in the method in FIG. 1, and the number of second aggregation levels is M=4.

804: The base station evenly assigns a to the set {2, 4, 8, 16}, where each aggregation level obtains a/m EPDCCH candidates, and m=4 herein.

It should be noted that, when a/m has a decimal part, only an integer part is used; for example, if a/m=4.3, 4 is used.

805: The base station assigns one of (a−⌊a/m⌋−⌊a/m⌋−⌊a/m⌋−⌊a/m⌋) remaining EPDCCH candidates to the aggregation levels {2, 4, 8, 16} in sequence according to a descending order of the aggregation levels.

It should be noted that, the embodiment of the present invention does not limit the method for assigning remaining EPDCCH candidates, and the remaining EPDCCH candidates may be assigned according to a descending order or an ascending order, or based on a certain predetermined sequence.

A more generalized assignment criterion may be expressed as follows: it is assumed that aggregation levels that can be supported by an enhanced control channel determined according to a certain threshold are L1, L2, . . . , Lk (the total number of aggregation levels is k), where the numbers of candidates corresponding to the aggregation levels are $M_{L1}, M_{L2}, \ldots, M_{Lk}$, respectively. It is assumed that the aggregation level Li cannot meet a code rate requirement of an enhanced control channel with a certain DCI format; then a user terminal skips the detection of this aggregation level, and at the same time assigns the number of blind detection times $M_{Li}$ corresponding to this aggregation level to other aggregation levels (the total number of aggregation levels is m) that meet the condition. The number of blind detection times of the $j^{th}$ aggregation level after the first assignment is:

$$M'_{Lj} = M_{Lj} + \lfloor M_{Li}/m \rfloor \quad (15)$$

The number of remaining blind detection times after the first assignment is:

$$R = \left(M_{Li} - \sum_{t \neq i}(M'_{Lt} - M_{Lt})\right) \quad (16)$$

R is evenly assigned to the other aggregation levels that meet the condition starting from a low aggregation level or a high aggregation level.

In the embodiment of the present invention, the base station reassigns the number of EPDCCH candidates corresponding to the aggregation level not supported by the EPDCCH to be detected, thereby improving the utilization of the EPDCCH candidates.

Figure 9:
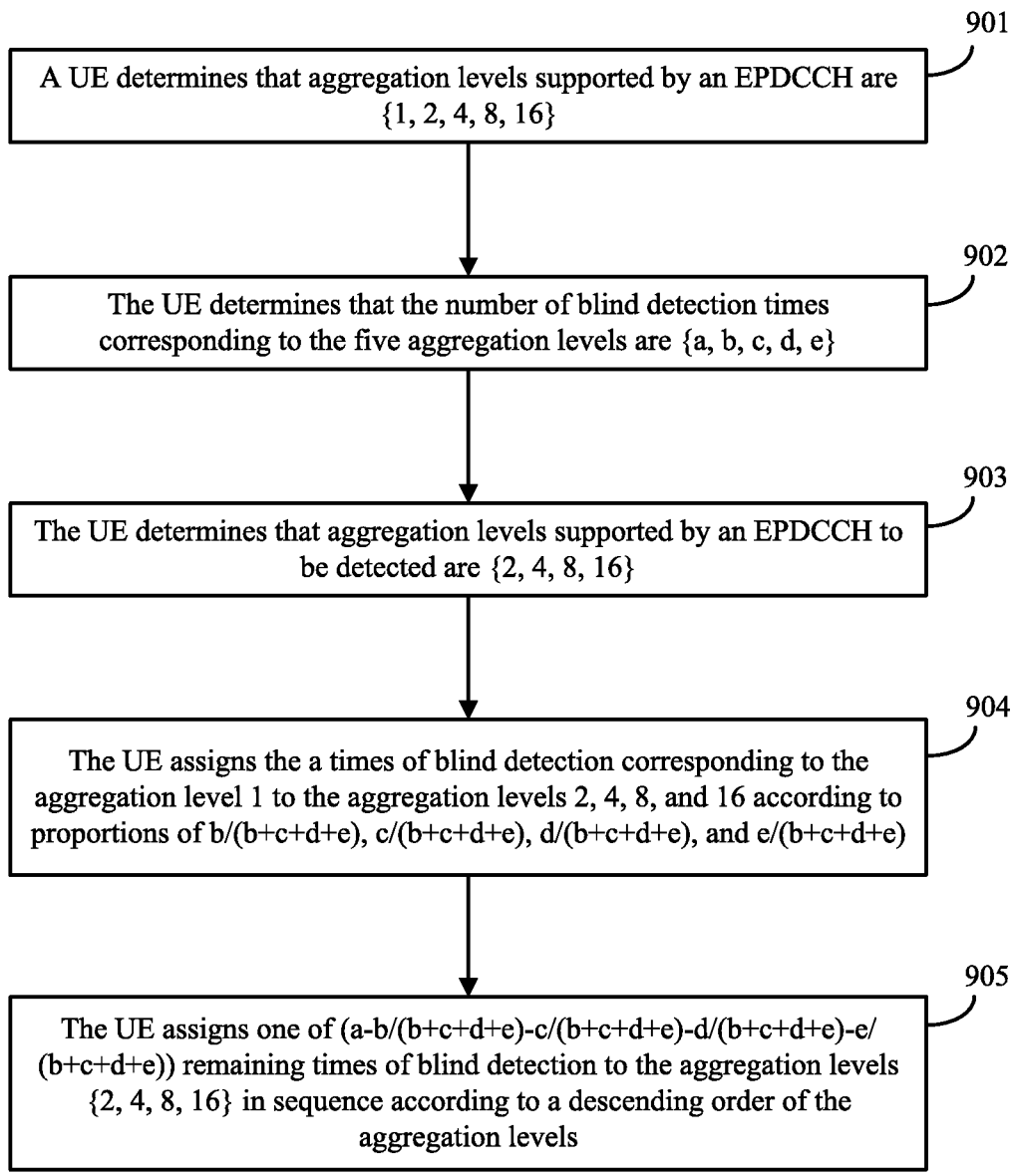
FIG. 9 is a flowchart of a method for assigning the number of blind detection times according to another embodiment of the present invention.

FIG. 9 is a flowchart of a method for assigning the number of blind detection times according to another embodiment of the present invention. The embodiment in FIG. 9 is corresponding to the embodiment in FIG. 5. The assignment manner of the number of EPDCCH candidates in the embodiment in FIG. 5 and the assignment manner of the number of blind detection times in the embodiment in FIG. 9 are the same or corresponding to each other. To avoid repetition, the assignment manner is not described in detail again.

901: A UE determines that aggregation levels supported by an EPDCCH are {1, 2, 4, 8, 16}.

902: The UE determines that the number of blind detection times corresponding to the five aggregation levels are {a, b, c, d, e}.

903: The UE determines that aggregation levels supported by an EPDCCH to be detected are {2, 4, 8, 16}.

904: The UE assigns the a times of blind detection corresponding to the aggregation level 1 to the aggregation levels 2, 4, 8, and 16 according to proportions of b/(b+c+d+e), c/(b+c+d+e), d/(b+c+d+e), and e/(b+c+d+e).

905: The UE assigns one of (a−b/(b+c+d+e)−c/(b+c+d+e)−d/(b+c+d+e)−e/(b+c+d+e)) remaining times of blind detection to the aggregation levels {2, 4, 8, 16} in sequence according to a descending order of the aggregation levels.

In the embodiment of the present invention, the UE reassigns the number of blind detection times corresponding to an aggregation level that is not supported by the EPDCCH to be detected, thereby improving the utilization of the blind detection times.

Figure 10:
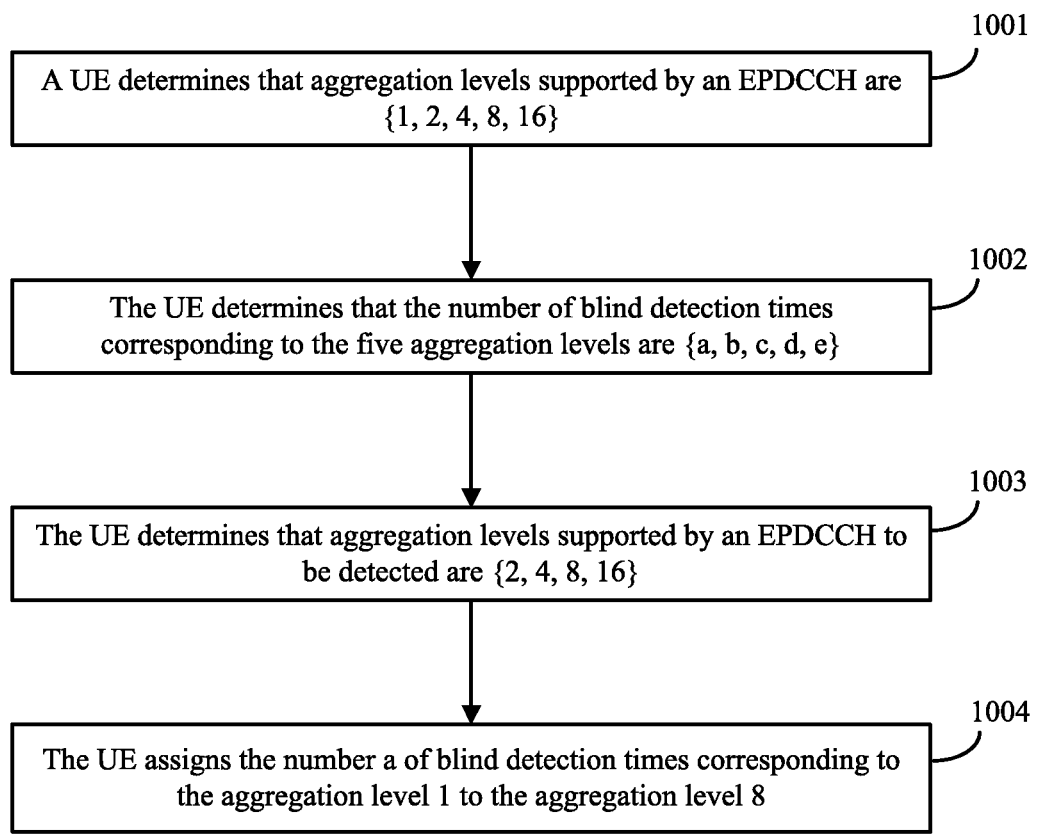
FIG. 10 is a flowchart of a method for assigning the number of blind detection times according to another embodiment of the present invention.

FIG. 10 is a flowchart of a method for assigning the number of blind detection times according to another embodiment of the present invention. The embodiment in FIG. 10 is corresponding to the embodiment in FIG. 6. The assignment manner of the number of EPDCCH candidates in the embodiment in FIG. 6 and the assignment manner of the number of blind detection times in the embodiment in FIG. 10 are the same or corresponding to each other. To avoid repetition, the assignment manner is not described in detail again.

1001: A UE determines that aggregation levels supported by an EPDCCH are {1, 2, 4, 8, 16}.

1002: The UE determines that the number of blind detection times corresponding to the five aggregation levels are {a, b, c, d, e}.

1003: The UE determines that aggregation levels supported by an EPDCCH to be detected are {2, 4, 8, 16}.

1004: The UE assigns the number a of blind detection times corresponding to the aggregation level 1 to the aggregation level 8.

In the embodiment of the present invention, the UE reassigns the number of blind detection times corresponding to an aggregation level that is not supported by the EPDCCH to be detected, thereby improving the utilization of the blind detection times.

Figure 11:
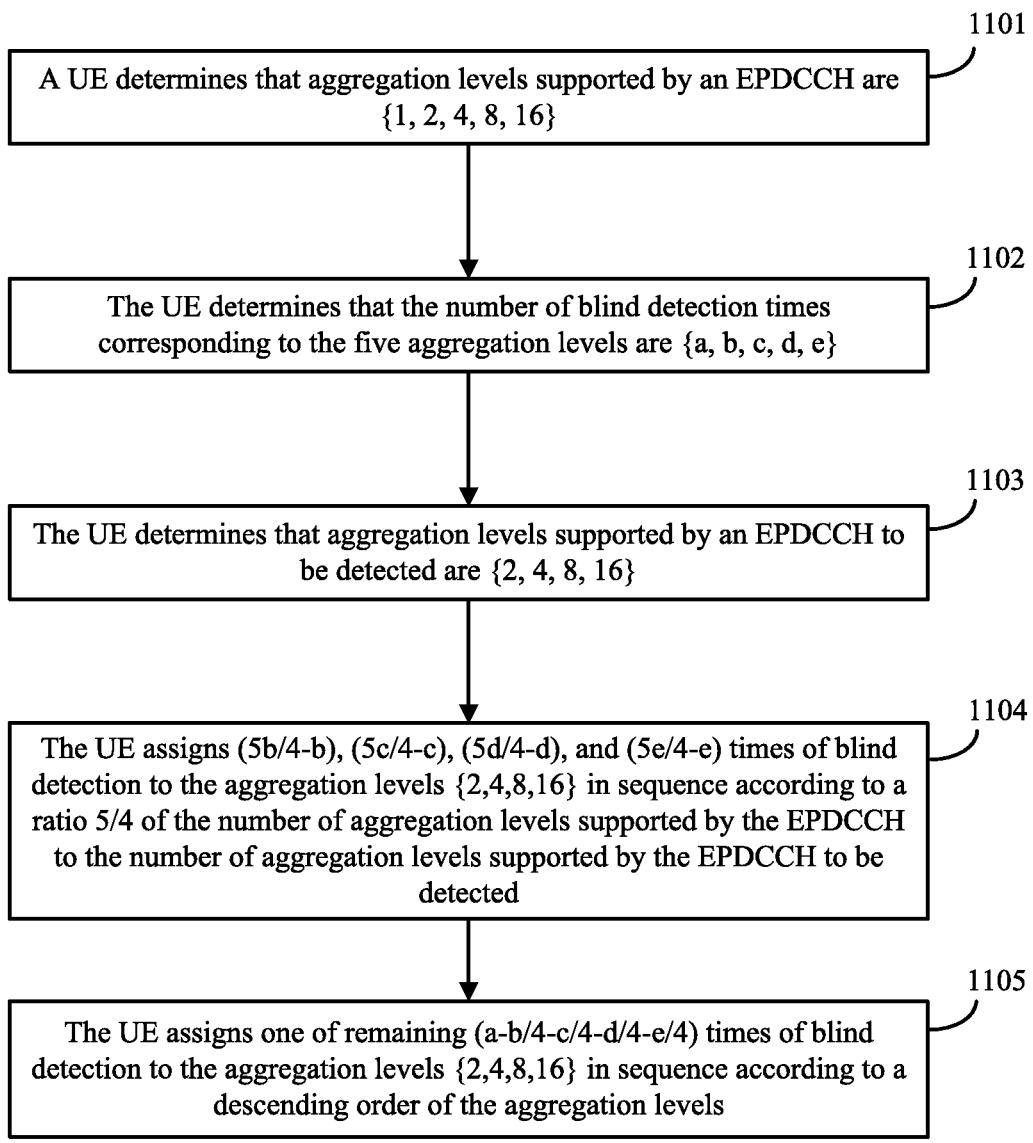
FIG. 11 is a flowchart of a method for assigning the number of blind detection times according to another embodiment of the present invention.

FIG. 11 is a flowchart of a method for assigning the number of blind detection times according to another embodiment of the present invention. The embodiment in FIG. 11 is corresponding to the embodiment in FIG. 7; the assignment manner of the number of EPDCCH candidates in the embodiment in FIG. 7 and the assignment manner of the number of blind detection times in the embodiment in FIG. 11 are the same or corresponding to each other. To avoid repetition, the assignment manner is not described in detail again.

1101: A UE determines that aggregation levels supported by an EPDCCH are {1, 2, 4, 8, 16}.

1102: The UE determines that the number of blind detection times corresponding to the five aggregation levels are {a, b, c, d, e}.

1103: The UE determines that aggregation levels supported by an EPDCCH to be detected are {2, 4, 8, 16}.

1104: The UE assigns 5b/4, 5c/4, 5d/4, and 5e/4 times of blind detection to the aggregation levels {2, 4, 8, 16} in sequence according to a ratio 5/4 of the number of aggregation levels supported by the EPDCCH to the number of aggregation levels supported by the EPDCCH to be detected.

1105: The UE assigns one of remaining (a−5b/4−5c/4−5d/4−5e/4) times of blind detection to the aggregation levels {2, 4, 8, 16} in sequence according to a descending order of the aggregation levels.

In the embodiment of the present invention, the UE reassigns the number of blind detection times corresponding to an aggregation level that is not supported by the EPDCCH to be detected, thereby improving the utilization of the blind detection times.

Figure 12:
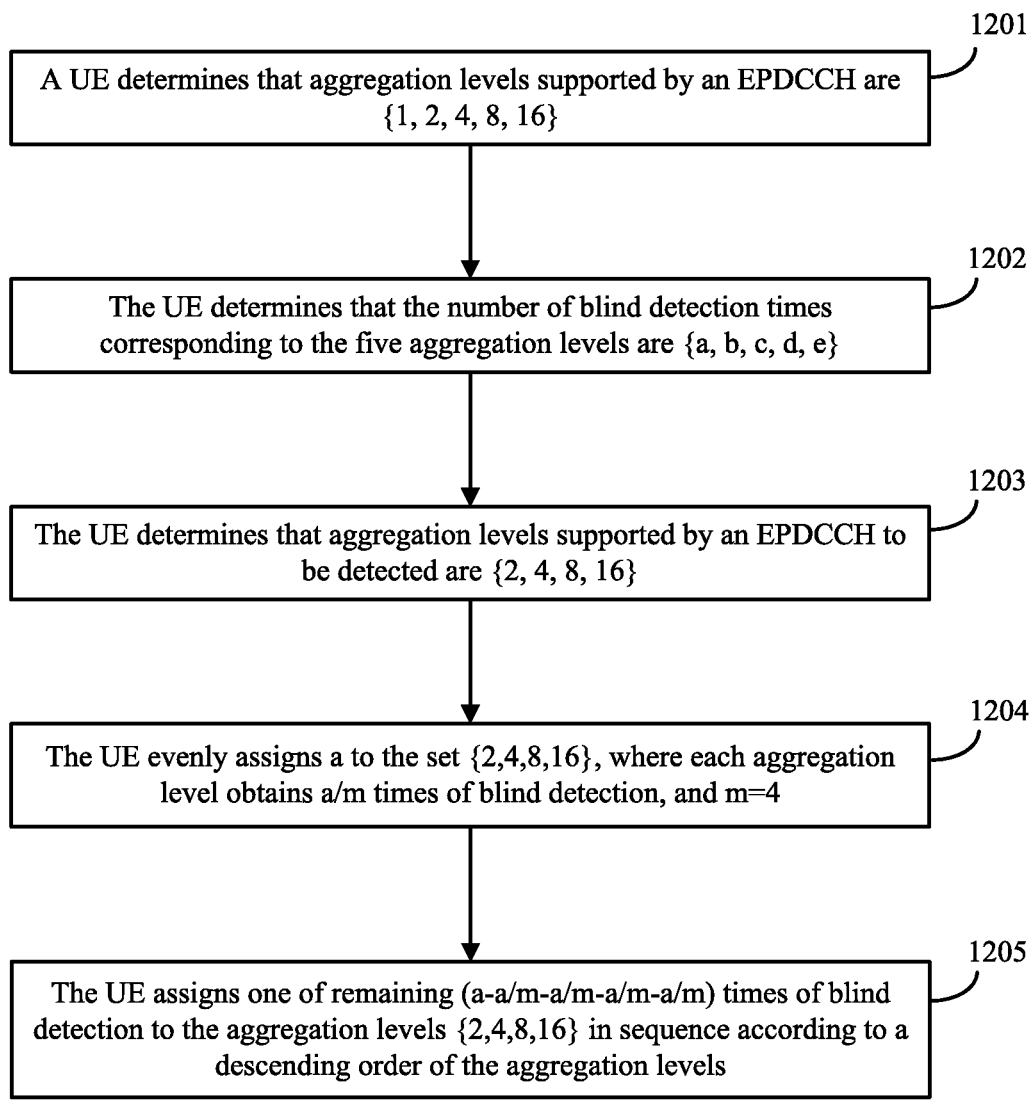
FIG. 12 is a flowchart of a method for assigning the number of blind detection times according to another embodiment of the present invention.

FIG. 12 is a flowchart of a method for assigning the number of blind detection times according to another embodiment of the present invention. The embodiment in FIG. 12 is corresponding to the embodiment in FIG. 8. The assignment manner of the number of EPDCCH candidates in the embodiment in FIG. 8 and the assignment manner of the number of blind detection times in the embodiment in FIG. 12 are the same or corresponding to each other. To avoid repetition, the assignment manner is not described in detail again.

1201: A UE determines that aggregation levels supported by an EPDCCH are {1, 2, 4, 8, 16}.

1202: The UE determines that the number of blind detection times corresponding to the five aggregation levels are {a, b, c, d, e}.

1203: The UE determines that aggregation levels supported by an EPDCCH to be detected are {2, 4, 8, 16}.

1204: The UE evenly assigns a to the set {2, 4, 8, 16}, where each aggregation level obtains a/4 times of blind detection.

1205: The UE assigns one of remaining (a−5b/4−5c/4−5d/4−5e/4) times of blind detection to the aggregation levels {2, 4, 8, 16} in sequence according to a descending order of the aggregation levels.

In the embodiment of the present invention, the UE reassigns the number of blind detection times corresponding to an aggregation level that is not supported by the EPDCCH to be detected, thereby improving the utilization of the blind detection times.

Figure 13:
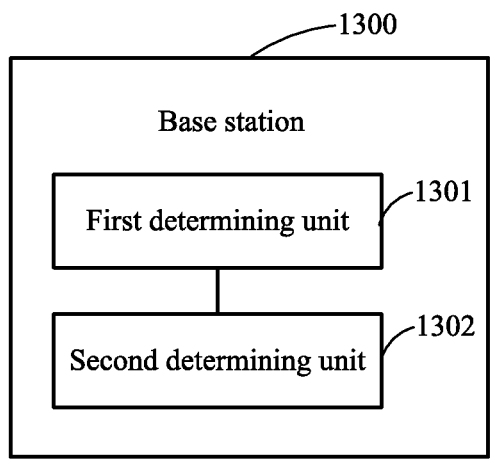
FIG. 13 is a block diagram of a base station according to an embodiment of the present invention.

FIG. 13 is a block diagram of a base station according to an embodiment of the present invention. A base station 1300 in FIG. 13 includes a first determining unit 1301 and a second determining unit 1302. The base station in FIG. 13 is capable of executing the steps performed by the base station in FIG. 1, FIG. 2, and FIG. 5 to FIG. 8. To avoid repetition, the steps are not described in detail again.

The first determining unit 1301 is configured to determine a first aggregation level set $\{L_{1i}\}$, and determine the number of EPDCCH candidates corresponding to each aggregation level in the aggregation level $\{L_{1i}\}$, where $\{L_{1i}\}$ is formed by N aggregation levels supported by an EPDCCH, i is a positive integer, and a value of i ranges from 1 to N.

The second determining unit 1302 is configured to determine a second aggregation level set $\{L_{2j}\}$, and determine the number of EPDCCH candidates corresponding to each aggregation level in the aggregation level $\{L_{2j}\}$, where $\{L_{2j}\}$ is formed by M aggregation levels supported by an EPDCCH to be detected, j is a positive integer, a value of j ranges from 1 to M, $\{L_{2j}\}$ is a subset of $\{L_{1i}\}$, M≤N, and the number of EPDCCH candidates corresponding to $L_{2j}$ in $\{L_{2j}\}$ is greater than or equal to the number of EPDCCH candidates corresponding to $L_{2j}$ in $\{L_{1i}\}$.

In the embodiment of the present invention, the base station reassigns the number of EPDCCH candidates corresponding to the aggregation level not supported by the EPDCCH to be detected, thereby improving the utilization of the EPDCCH candidates.

Optionally, as another embodiment, the second determining unit 1302 is specifically configured to determine (N−M) remaining aggregation level after the aggregation levels in $\{L_{2j}\}$ are removed from $\{L_{1i}\}$; determine the total number P of EPDCCH candidates corresponding to the (N−M) aggregation level in $\{L_{1i}\}$; and assign P EPDCCH candidates to the aggregation levels in $\{L_{2j}\}$.

Optionally, as another embodiment, the second determining unit 1302 is specifically configured to assign P1 EPDCCH candidates to the aggregation levels in $\{L_{2j}\}$ in a first time; and assign P2 EPDCCH candidates to the aggregation levels in $\{L_{2j}\}$ in a second time, where P1+P2≤P.

Optionally, as another embodiment, the second determining unit 1302 is specifically configured to evenly assign the P1 EPDCCH candidates to the aggregation levels in $\{L_{2j}\}$.

Optionally, as another embodiment, the second determining unit 1302 is specifically configured to assign the P1 EPDCCH candidates according to a ratio of the number of EPDCCH candidates corresponding to each aggregation level of $\{L_{2j}\}$ in $\{L_{1i}\}$ to the total number of EPDCCH candidates corresponding to all the aggregation levels of $\{L_{2j}\}$ in $\{L_{1i}\}$.

Optionally, as another embodiment, the second determining unit 1302 is specifically configured to assign the P1 EPDCCH candidates to the aggregation levels in $\{L_{2j}\}$ according to a proportional relationship between N and M.

Optionally, as another embodiment, the second determining unit 1302 is specifically configured to cyclically assign one EPDCCH candidate to the aggregation levels in $\{L_{2j}\}$ in sequence according to an ascending order of the aggregation levels; or cyclically assign one EPDCCH candidate to the aggregation levels in $\{L_{2j}\}$ in sequence according to a descending order of the aggregation levels.

Optionally, as another embodiment, the second determining unit 1302 is specifically configured to assign the P1 EPDCCH candidates to one aggregation level in $\{L_{2j}\}$.

Optionally, as another embodiment, the second determining unit 1302 is specifically configured to determine $\{L_{2j}\}$ according to a DCI format of the EPDCCH to be detected and/or the number of available resource units of each physical resource block pair corresponding to the EPDCCH to be detected.

Optionally, as another embodiment, the second determining unit 1302 is specifically configured to determine at least one threshold according to the DCI format of the EPDCCH; and determine $\{L_{2j}\}$ according to the at least one threshold.

Figure 14:
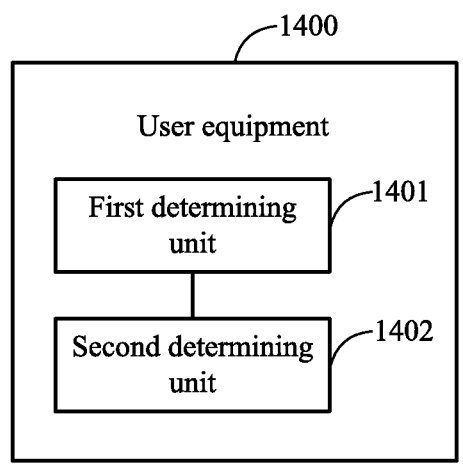
FIG. 14 is a block diagram of a user equipment according to an embodiment of the present invention.

FIG. 14 is a block diagram of a UE according to an embodiment of the present invention. A UE 1400 in FIG. 14 includes a first determining unit 1401 and a second determining unit 1402. The UE in FIG. 14 is capable of executing corresponding steps in FIG. 3, FIG. 4, and FIG. 9 to FIG. 12. To avoid repetition, the steps are not described in detail again.

The first determining unit 1401 is configured to determine a first aggregation level set $\{L_{1i}\}$, and determine the number of blind detection times corresponding to each aggregation level in the aggregation level $\{L_{1i}\}$, where $\{L_{1i}\}$ is formed by N aggregation levels supported by an EPDCCH, i is a positive integer, and a value of i ranges from 1 to N.

The second determining unit 1402 is configured to determine a second aggregation level set $\{L_{2j}\}$, and determine the number of blind detection times corresponding to each aggregation level in the aggregation level $\{L_{2j}\}$, where $\{L_{2j}\}$ is formed by M aggregation levels supported by an EPDCCH to be detected, j is a positive integer, a value of j ranges from 1 to M, $\{L_{2j}\}$ is a subset of $\{L_{1i}\}$, M≤N, and the number of blind detection times corresponding to $L_{2j}$ in $\{L_{2j}\}$ is greater than or equal to the number of blind detection times corresponding to $L_{2j}$ in $\{L_{1i}\}$.

In the embodiment of the present invention, the UE reassigns the number of blind detection times corresponding to an aggregation level that is not supported by the EPDCCH to be detected, thereby improving the utilization of the blind detection times.

Optionally, as another embodiment, the second determining unit 1402 is specifically configured to determine (N−M) remaining aggregation level after the aggregation levels in $\{L_{2j}\}$ are removed from $\{L_{1i}\}$; determine the number P of blind detection times corresponding to the (N−M) aggregation level in $\{L_{1i}\}$; and assign P times of blind detection to the aggregation levels in $\{L_{2j}\}$.

Optionally, as another embodiment, the second determining unit 1402 is specifically configured to assign P1 times of blind detection to the aggregation levels in $\{L_{2j}\}$ in a first time; and assign P2 times of blind detection to the aggregation levels in $\{L_{2j}\}$ in a second time, where P1+P2≤P.

Optionally, as another embodiment, the second determining unit 1402 is specifically configured to evenly assign the P1 times of blind detection to the aggregation levels in $\{L_{2j}\}$.

Optionally, as another embodiment, the second determining unit 1402 is specifically configured to assign the P1 times of blind detection according to a ratio of the number of blind detection times corresponding to each aggregation level of $\{L_{2j}\}$ in $\{L_{1i}\}$ to the total number of blind detection times corresponding to all the aggregation levels of $\{L_{2j}\}$ in $\{L_{1i}\}$.

Optionally, as another embodiment, the second determining unit 1402 is specifically configured to assign the P1 times of blind detection to the aggregation levels in $\{L_{2j}\}$ according to a proportional relationship between N and M.

Optionally, as another embodiment, the second determining unit 1402 is specifically configured to cyclically assign one time of blind detection to the aggregation levels in $\{L_{2j}\}$ in sequence according to an ascending order of the aggregation levels; or cyclically assign one time of blind detection to the aggregation levels in $\{L_{2j}\}$ in sequence according to a descending order of the aggregation levels.

Optionally, as another embodiment, the second determining unit 1402 is specifically configured to assign the P1 times of blind detection to one aggregation level in $\{L_{2j}\}$.

Optionally, as another embodiment, the second determining unit 1402 is specifically configured to determine $\{L_{2j}\}$ according to a DCI format of the EPDCCH to be detected and/or the number of available resource units of each physical resource block pair corresponding to the EPDCCH to be detected.

Optionally, as another embodiment, the second determining unit 1402 is specifically configured to determine at least one threshold according to the DCI format of the EPDCCH; and determine $\{L_{2j}\}$ according to the at least one threshold.

Figure 15:
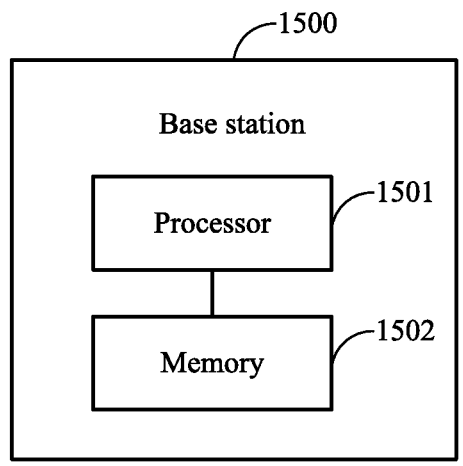
FIG. 15 is a block diagram of a base station according to another embodiment of the present invention.

FIG. 15 is a block diagram of a base station according to another embodiment of the present invention. A base station 1500 includes a processor 1501 and a memory 1502. The base station in FIG. 15 is capable of executing the steps performed by the base station in FIG. 1, FIG. 2, and FIG. 5 to FIG. 8. To avoid repetition, the steps are not described in detail again.

The processor 1501 is configured to determine a first aggregation level set $\{L_{1i}\}$, and determine the number of EPDCCH candidates corresponding to each aggregation level in the aggregation level $\{L_{1i}\}$, where $\{L_{1i}\}$ is formed by N aggregation levels supported by an EPDCCH, i is a positive integer, and a value of i ranges from 1 to N. The memory 1502 is configured to store $\{L_{1i}\}$ and the number of EPDCCH candidates corresponding to the aggregation levels in $\{L_{1i}\}$.

The processor 1501 is configured to determine a second aggregation level set $\{L_{2j}\}$, and determine the number of EPDCCH candidates corresponding to each aggregation level in the aggregation level $\{L_{2j}\}$, where $\{L_{2j}\}$ is formed by M aggregation levels supported by an EPDCCH to be detected, j is a positive integer, a value of j ranges from 1 to M, $\{L_{2j}\}$ is a subset of $\{L_{1i}\}$, M≤N, and the number of EPDCCH candidates corresponding to $L_{2j}$ in $\{L_{2j}\}$ is greater than or equal to the number of EPDCCH candidates corresponding to $L_{2j}$ in $\{L_{1i}\}$. The memory 1502 is configured to store $\{L_{2j}\}$ and the number of EPDCCH candidates corresponding to the aggregation levels in $\{L_{2j}\}$.

In the embodiment of the present invention, the base station reassigns the number of EPDCCH candidates corresponding to the aggregation level not supported by the EPDCCH to be detected, thereby improving the utilization of the EPDCCH candidates.

Optionally, as another embodiment, the processor 1501 is specifically configured to get $\{L_{1i}\}$ from the memory 1502, determine (N−M) remaining aggregation level after the aggregation levels in $\{L_{2j}\}$ are removed from $\{L_{1i}\}$; determine the total number P of EPDCCH candidates corresponding to the (N−M) aggregation level in $\{L_{1i}\}$; and assign P EPDCCH candidates to the aggregation levels in $\{L_{2j}\}$.

Optionally, as another embodiment, the processor 1501 is specifically configured to get $\{L_{2j}\}$ from the memory 1502, assign P1 EPDCCH candidates to the aggregation levels in $\{L_{2j}\}$ in a first time; and assign P2 EPDCCH candidates to the aggregation levels in $\{L_{2j}\}$ in a second time, where P1+P2≤P.

Optionally, as another embodiment, the processor 1501 is specifically configured to evenly assign the P1 EPDCCH candidates to the aggregation levels in $\{L_{2j}\}$.

Optionally, as another embodiment, the processor 1501 is specifically configured to assign the P1 EPDCCH candidates according to a ratio of the number of EPDCCH candidates corresponding to each aggregation level of $\{L_{2j}\}$ in $\{L_{1i}\}$ to the total number of EPDCCH candidates corresponding to all the aggregation levels of $\{L_{2j}\}$ in $\{L_{1i}\}$.

Optionally, as another embodiment, the processor 1501 is specifically configured to assign the P1 EPDCCH candidates to the aggregation levels in $\{L_{2j}\}$ according to a proportional relationship between N and M.

Optionally, as another embodiment, the processor 1501 is specifically configured to cyclically assign one EPDCCH candidate to the aggregation levels in $\{L_{2j}\}$ in sequence according to an ascending order of the aggregation levels; or cyclically assign one EPDCCH candidate to the aggregation levels in $\{L_{2j}\}$ in sequence according to a descending order of the aggregation levels.

Optionally, as another embodiment, the processor 1501 is specifically configured to assign the P1 EPDCCH candidates to one aggregation level in $\{L_{2j}\}$.

Optionally, as another embodiment, the processor 1501 is specifically configured to determine $\{L_{2j}\}$ according to a DCI format of the EPDCCH to be detected and/or the number of available resource units of each physical resource block pair corresponding to the EPDCCH to be detected.

Optionally, as another embodiment, the processor 1501 is specifically configured to determine at least one threshold according to the DCI format of the EPDCCH; and determine $\{L_{2j}\}$ according to the at least one threshold.

Figure 16:
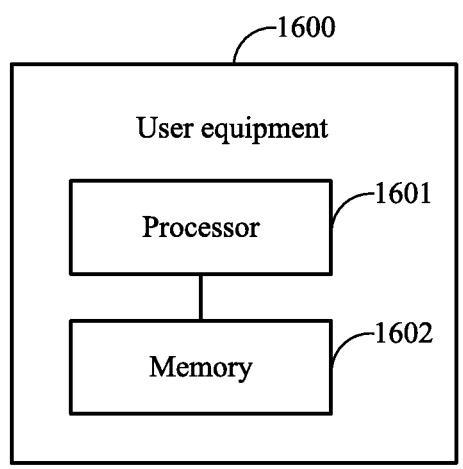
FIG. 16 is a block diagram of a user equipment according to another embodiment of the present invention.

FIG. 16 is a block diagram of a user equipment according to another embodiment of the present invention. UE 1600 includes a processor 1601 and a memory 1602 The UE in FIG. 16 is capable of executing the corresponding steps in FIG. 3, FIG. 4, and FIG. 9 to FIG. 12. To avoid repetition, the steps are not described in detail again.

The processor 1601 is configured to determine a first aggregation level set $\{L_{1i}\}$, and determine the number of blind detection times corresponding to each aggregation level in the first aggregation level set $\{L_{1i}\}$, where $\{L_{1i}\}$ is formed by N aggregation levels supported by an EPDCCH, i is a positive integer, and a value of i ranges from 1 to N. The memory 1602 is configured to store $\{L_{1i}\}$ and the number of blind detection times corresponding to the aggregation levels in $\{L_{1i}\}$.

The processor 1601 is configured to determine a second aggregation level set $\{L_{2j}\}$, and determine the number of blind detection times corresponding to each aggregation level in the aggregation level $\{L_{2j}\}$, where $\{L_{2j}\}$ is formed by M aggregation levels supported by an EPDCCH to be detected, j is a positive integer, a value of j ranges from 1 to M, $\{L_{2j}\}$ is a subset of $\{L_{1i}\}$, M≤N, and the number of blind detection times corresponding to $L_{2j}$ in $\{L_{2j}\}$ is greater than or equal to the number of blind detection times corresponding to $L_{2j}$ in $\{L_{1i}\}$. The memory 1602 is configured to store $\{L_{2j}\}$ and the number of blind detection times corresponding to the aggregation levels in $\{L_{2j}\}$.

In the embodiment of the present invention, the UE reassigns the number of blind detection times corresponding to an aggregation level that is not supported by the EPDCCH to be detected, thereby improving the utilization of the blind detection times.

Optionally, as another embodiment, the processor 1601 is specifically configured to get $\{L_{1i}\}$ from the processor, determine (N−M) remaining aggregation level after the aggregation levels in $\{L_{2j}\}$ are removed from $\{L_{1i}\}$; determine the number P of blind detection times corresponding to the (N−M) aggregation level in $\{L_{1i}\}$; and assign P times of blind detection to the aggregation levels in $\{L_{2j}\}$.

Optionally, as another embodiment, the processor 1601 is specifically configured to get $\{L_{2j}\}$ from the processor, assign P1 times of blind detection to the aggregation levels in $\{L_{2j}\}$ in a first time; and assign P2 times of blind detection to the aggregation levels in $\{L_{2j}\}$ in a second time, where P1+P2≤P.

Optionally, as another embodiment, the processor 1601 is specifically configured to evenly assign the P1 times of blind detection to the aggregation levels in $\{L_{2j}\}$.

Optionally, as another embodiment, the processor 1601 is specifically configured to assign the P1 times of blind detection according to a ratio of the number of blind detection times corresponding to each aggregation level of $\{L_{2j}\}$ in $\{L_{1i}\}$ to the total number of blind detection times corresponding to all the aggregation levels of $\{L_{2j}\}$ in $\{L_{1i}\}$.

Optionally, as another embodiment, the processor 1601 is specifically configured to assign the P1 times of blind detection to the aggregation levels in $\{L_{2j}\}$ according to a proportional relationship between N and M.

Optionally, as another embodiment, the processor 1601 is specifically configured to cyclically assign one time of blind detection to the aggregation levels in $\{L_{2j}\}$ in sequence according to an ascending order of the aggregation levels; or cyclically assign one time of blind detection to the aggregation levels in $\{L_{2j}\}$ in sequence according to a descending order of the aggregation levels.

Optionally, as another embodiment, the processor 1601 is specifically configured to assign the P1 times of blind detection to one aggregation level in $\{L_{2j}\}$.

Optionally, as another embodiment, the processor 1601 is specifically configured to determine $\{L_{2j}\}$ according to a DCI format of the EPDCCH to be detected and/or the number of available resource units of each physical resource block pair corresponding to the EPDCCH to be detected.

Optionally, as another embodiment, the processor 1601 is specifically configured to determine at least one threshold according to the DCI format of the EPDCCH; and determine $\{L_{2j}\}$ according to the at least one threshold.

Optionally, another embodiment can be implemented. (How to determine candidate assignment of each aggregation level.)

Under different set sizes of {2, 4, 8}, the total number of candidates is assigned among the aggregation levels. Under different set sizes, that is, the different numbers of physical resource block pairs, the number of enhanced control channel elements ECCEs is different. For example, when each physical resource block pair corresponds to physical resource units of 4 ECCEs, the number of enhanced control channel elements ECCEs in 2 physical resource block pairs is 8, and therefore, the total numbers of candidates of different aggregation levels {1, 2, 4, 8, 16} that can be supported by the 2 physical resource block pairs are {8, 4, 2, 1, 0}, respectively; the total number of enhanced control channel elements in 4 physical resource block pairs is 16, and therefore, the total numbers of candidates of different aggregation levels {1, 2, 4, 8, 16} that can be supported by the 4 physical resource block pairs are {16, 8, 4, 2, 1}, respectively. Accordingly, the total number of enhanced control channel elements in 8 physical resource block pairs is 32, and therefore, the total numbers of candidates of different aggregation levels {1, 2, 4, 8, 16} that can be supported by the 8 physical resource block pairs are {32, 16, 8, 4, 2}, respectively.

There are two options for the assignment of the total number of candidates among different aggregation levels.

(1) For the total number M of candidates, candidate assignment 1 of each aggregation level is determined according to the total numbers of candidates of different aggregation levels that can be supported by a maximum set size, that is, the maximum number of physical resource block pairs. For example, the M candidates are assigned to different aggregation levels according to the total number of candidates that can be supported by 8 physical resource block pairs. It is assumed that after the assignment, the total numbers of the candidates that can be supported by the aggregation levels {1, 2, 4, 8, 16} are {4, 6, 2, 2, 2}, respectively. At this time, in a case of 4 physical resource block pairs, the total number of candidates of the aggregation level 16 is 2, but the total number of candidates that actually can be supported by the aggregation level 16 is only 1. However, no matter whether the number of physical resource block pairs in each set is 2, 4, or 8, the total number of candidates of the aggregation level 16 is 2 by default in this case. During candidate assignment between two sets for each aggregation level, further assignment among multiple sets based on a certain predetermined rule is performed according to the total number of candidates of each aggregation level determined in the candidate assignment 1, such as {4, 6, 2, 2, 2} in the foregoing example.

(2) For the total number M of candidates, candidate assignment 2 for each aggregation level under different set sizes is determined according to an actual size of each set, that is, the total numbers of candidates of different aggregation levels that can be supported by physical resource block pairs in the set, where the total number of candidates that can be supported by each aggregation level should not exceed the total number of candidates that actually can be supported by the set. For example, M candidates are assigned to different aggregation levels according to the total number of candidates that can be supported by 8 physical resource block pairs, and it is assumed that after the assignment, the total numbers of candidates that can be supported by the aggregation levels {1, 2, 4, 8, 16} are {4, 6, 2, 2, 2}, respectively. After M candidates are assigned to different aggregation levels {1, 2, 4, 8, 16} according to the total number of candidates that can be supported by 4 physical resource block pairs, the total numbers of candidates of the aggregation levels are {4, 6, 2, 2, 1}, or {4, 6, 3, 2, 1}, or {4, 7, 2, 2, 1}, or {5, 6, 2, 2, 1}, or the like, respectively. After M candidates are assigned to different aggregation levels {1, 2, 4, 8, 16} according to the total number of candidates that can be supported by 2 physical resource block pairs, the total numbers of candidates of the aggregation levels are {4, 4, 2, 1, 0} or {8, 4, 2, 1, 0}, and the like, respectively. Similarly, in a case where the aggregation levels that can be supported are {2, 4, 8, 16}, M candidates are assigned to different aggregation levels according to the total number of candidates that can be supported by 8 physical resource block pairs in a similar way, and it is assumed that, after assignment, the total numbers of candidates that can be supported by the aggregation levels {2, 4, 8, 16} are {6, 6, 2, 2}, respectively. After M candidates are assigned to different aggregation levels {2, 4, 8, 16} according to the total number of candidates that can be supported by 4 physical resource block pairs, the total numbers of candidates of the aggregation levels are {6, 6, 2, 1}, or {6, 7, 2, 1}, or {7, 6, 2, 1}, and the like, respectively. After M candidates are assigned to different aggregation levels {2, 4, 8, 16} according to the total number of candidates that can be supported by 2 physical resource block pairs, the total numbers of candidates of the aggregation levels are {4, 2, 1, 0}, and the like, respectively.

During candidate assignment between two sets for each aggregation level, candidate assignment between two sets is performed according to the total number of candidates of each aggregation level under different set sizes determined in the candidate assignment 2. Optionally, the corresponding total number of candidates of each aggregation level may be determined according to a size of a larger set between the two sets. For example, for two sets with set sizes of 4 and 8 respectively, candidates of each aggregation level are assigned between two sets based on the total number of candidates of each aggregation level corresponding to the set size 8, such as {4, 6, 2, 2, 2} corresponding to {1, 2, 4, 8, 16} in the foregoing example.

As for option 2, an essential principle thereof may be concluded as follows: the total number of candidates of each aggregation level is associated with the total number of blind detection times corresponding to each DCI format and the total number of candidates corresponding to this aggregation level that actually can be supported by each set.

(3) Similar to the foregoing option (2), candidate assignment 2 for each aggregation level under different set sizes is determined according to an actual size of each set, that is, the total numbers of candidates of different aggregation levels that can be supported by physical resource block pairs in the set, where the total number of candidates that can be supported by each aggregation level should not exceed the total number of candidates that actually can be supported by the set. During candidate assignment between two sets for each aggregation level, candidate assignment between two sets is performed according to the total number of candidates of each aggregation level under a maximum set size determined in the candidate assignment 2.

In the foregoing options (2) and (3), the assignment of candidate of each aggregation level under different set sizes may be specifically shown as follows:

The assignment of candidate times in a set scenario in a centralized transmission mode:

| Set size (PRB pair#) | Normal subframes and special subframes, configuration 3, 4, 8, with available REs $X_{thresh}$ <104 and using normal CP | | | | All other cases | | | |
|---|---|---|---|---|---|---|---|---|
| | AL 2 | AL 4 | AL 8 | AL 16 | AL 1 | AL 2 | AL 4 | AL 8 |
| 8 | 6 | 6 | 2 | 2 | 6 | 6 | 2 | 2 |
| 4 | 6 | 4 | 2 | 1 | 6 | 6 | 2 | 2 |
| 2 | 4 | 2 | 1 | 0 | 6 | 4 | 2 | 1 |

The assignment of candidate times in a set scenario in a discrete transmission mode:

| Set size N(PRB pair#) | Normal subframes and special subframes, configuration 3, 4, 8, with available REs $X_{thresh}$ <104 and using normal CP | | | | All other cases | | | | |
|---|---|---|---|---|---|---|---|---|---|
| | 2 | 4 | 8 | 16 | 1 | 2 | 4 | 8 | 16 |
| 8 | 6 | 6 | 2 | 2 | 4 | 6 | 2 | 2 | 2 |
| 4 | 6 | 6 | 2 | 1 | 4 | 6 | 2 | 2 | 1 |
| 2 | 4 | 2 | 1 | 0 | 4 | 4 | 2 | 1 | 0 |

A person of ordinary skill in the art may be aware that, with reference to the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional module and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, or a network device or the like) to perform all or a part of the steps of the methods described in the embodiments of the present invention. The foregoing storage medium includes: any mediums capable of storing program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A method for assigning the number of control channel candidates, the method comprising:
    assigning, by a base station, M enhanced physical downlink control channel (EPDCCH) candidates based on a total number of candidates of different aggregation levels supported by a maximum number of physical resource block pairs;

determining, by the base station, a first aggregation level set $\{L_{1i}\}$ and a number of EPDCCH candidates corresponding to each aggregation level in the set $\{L_{1i}\}$, wherein the set $\{L_{1i}\}$ is formed by N aggregation levels supported by an EPDCCH, where i is a positive integer that ranges from 1 to N;

reassigning, by the base station, the M EPDCCH candidates from the maximum number of physical resource block pairs to an another number of physical resource block pairs, based on a total number of candidates of the different aggregation levels supported by the another number of physical resource block pairs and the determined number of EPDCCH candidates corresponding to each aggregation level in the $\{L_{1i}\}$; and determining, by the base station, a second aggregation level set $\{L_{2j}\}$ and a number of EPDCCH candidates corresponding to each aggregation level in the set $\{L_{2j}\}$, wherein the set $\{L_{2j}\}$ is formed by M aggregation levels supported by an EPDCCH to be detected, j is a positive integer that ranges from 1 to M, the set $\{L_{2j}\}$ is a subset of the set $\{L_{1i}\}$, M≤N, and the number of EPDCCH candidates corresponding to $L_{2j}$ in the set $\{L_{2j}\}$ is greater than or equal to the number of EPDCCH candidates corresponding to $L_{2j}$ in the set $\{L_{1i}\}$.

2. The method according to claim 1, wherein determining the number of EPDCCH candidates corresponding to each aggregation level in the set $\{L_{2j}\}$ comprises:

determining, by the base station, (N−M) remaining aggregation level after the aggregation levels in the set $\{L_{2j}\}$ are removed from the set $\{L_{1i}\}$;

determining, by the base station, the total number P of EPDCCH candidates corresponding to the (N−M) aggregation level in the set $\{L_{1i}\}$; and assigning, by the base station, at most P EPDCCH candidates to the aggregation levels in the set $\{L_{2j}\}$.

3. The method according to claim 2, wherein assigning P EPDCCH candidates to the aggregation levels in the set $\{L_{2j}\}$ comprises:

assigning, by the base station, P1 EPDCCH candidates to the aggregation levels in the set $\{L_{2j}\}$ in a first time; and assigning, by the base station, P2 EPDCCH candidates to the aggregation levels in the set $\{L_{2j}\}$ in a second time, wherein P1+P2≤P.

4. The method according to claim 3, wherein assigning P1 EPDCCH candidates to the aggregation levels in the set $\{L_{2j}\}$ in a first time comprises evenly assigning, by the base station, the P1 EPDCCH candidates to the aggregation levels in the set $\{L_{2j}\}$.

5. The method according to claim 3, wherein assigning P1 EPDCCH candidates to the aggregation levels in the set $\{L_{2j}\}$ in a first time comprises assigning, by the base station, the P1 EPDCCH candidates according to a ratio of the number of EPDCCH candidates corresponding to each aggregation level of the set $\{L_{2j}\}$ in the set $\{L_{1i}\}$ to the total number of EPDCCH candidates corresponding to all the aggregation levels of the set $\{L_{2j}\}$ in the set $\{L_{1i}\}$.

6. The method according to claim 3, wherein assigning P1 EPDCCH candidates to the aggregation levels in the set $\{L_{2j}\}$ in a first time comprises assigning, by the base station, the P1 EPDCCH candidates to the aggregation levels in the set $\{L_{2j}\}$ according to a proportional relationship between N and M.

7. The method according to claim 3, wherein assigning P1 EPDCCH candidates to the aggregation levels in the set $\{L_{2j}\}$ in a first time comprises assigning, by the base station, the P1 EPDCCH candidates to one aggregation level in the set $\{L_{2j}\}$.

8. A base station, comprising:

a processor; and a memory coupled to the processor, wherein the memory stores instructions to program the processor to:

assign M enhanced physical downlink control channel (EPDCCH) candidates based on a total number of candidates of different aggregation levels supported by a maximum number of physical resource block pairs;

determine a first aggregation level set $\{L_{1i}\}$ and a number of EPDCCH candidates corresponding to each aggregation level in the set $\{L_{1i}\}$, wherein the set $\{L_{1i}\}$ is formed by N aggregation levels supported by an EPDCCH and i is a positive integer that ranges from 1 to N;

reassign the M EPDCCH candidates from the maximum number of physical resource block pairs to an another number of physical resource block pairs, based on a total number of candidates of the different aggregation levels supported by the another number of physical resource block pairs and the determined number of EPDCCH candidates corresponding to each aggregation level in the $\{L_{1i}\}$; and determine a second aggregation level set $\{L_{2j}\}$ and a number of EPDCCH candidates corresponding to each aggregation level in the set $\{L_{2j}\}$, wherein the set $\{L_{2j}\}$ is formed by M aggregation levels supported by an EPDCCH to be detected, j is a positive integer that ranges from 1 to M, the set $\{L_{2j}\}$ is a subset of the set $\{L_{1i}\}$, M≤N, and the number of EPDCCH candidates corresponding to $L_{2j}$ in the set $\{L_{2j}\}$ is greater than or equal to the number of EPDCCH candidates corresponding to $L_{2j}$ in the set $\{L_{1i}\}$.

9. The base station according to claim 8, wherein the processor is programmed to:

determine (N−M) remaining aggregation level after the aggregation levels in the set $\{L_{2j}\}$ are removed from the set $\{L_{1i}\}$;

determine the total number P of EPDCCH candidates corresponding to the (N−M) aggregation level in the set $\{L_{1i}\}$; and assign at most P EPDCCH candidates to the aggregation levels in the set $\{L_{2j}\}$.

10. The base station according to claim 9, wherein the processor is programmed to:

assign P1 EPDCCH candidates to the aggregation levels in the set $\{L_{2j}\}$ in a first time; and assign P2 EPDCCH candidates to the aggregation levels in the set $\{L_{2j}\}$ in a second time, wherein P1+P2≤P.

11. The base station according to claim 10, wherein the processor is programmed to evenly assign the P1 EPDCCH candidates to the aggregation levels in the set $\{L_{2j}\}$.

12. The base station according to claim 10, wherein the processor is programmed to assign the P1 EPDCCH candidates according to a ratio of the number of EPDCCH candidates corresponding to each aggregation level of the set $\{L_{2j}\}$ in the set $\{L_{1i}\}$ to the total number of EPDCCH candidates corresponding to all the aggregation levels of the set $\{L_{2j}\}$ in the set $\{L_{1i}\}$.

13. The base station according to claim 10, wherein the processor is programmed to assign the P1 EPDCCH candidates to the aggregation levels in the set $\{L_{2j}\}$ according to a proportional relationship between N and M.

14. The base station according to claim 10, wherein the processor is programmed to
assign the P1 EPDCCH candidates to one aggregation level in the set $\{L_{2j}\}$.

* * * * *